United States Patent
Takahashi et al.

(10) Patent No.: US 9,565,378 B2
(45) Date of Patent: Feb. 7, 2017

(54) IMAGING DEVICE

(71) Applicant: OLYMPUS CORPORATION, Tokyo (JP)

(72) Inventors: Ayahiko Takahashi, Tokyo (JP); Yoshinobu Tanaka, Tokyo (JP); Takashi Yanada, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 78 days.

(21) Appl. No.: 14/477,222

(22) Filed: Sep. 4, 2014

(65) Prior Publication Data

US 2015/0070535 A1     Mar. 12, 2015

(30) Foreign Application Priority Data

Sep. 9, 2013    (JP) .................................. 2013-186472

(51) Int. Cl.
*H04N 5/217*    (2011.01)
*H04N 5/225*    (2006.01)
*H04N 5/361*    (2011.01)
*H04N 5/374*    (2011.01)
*H04N 5/372*    (2011.01)

(52) U.S. Cl.
CPC ............ *H04N 5/361* (2013.01); *H04N 5/3742* (2013.01); *H04N 5/37213* (2013.01)

(58) Field of Classification Search
CPC ... H04N 5/361; H04N 5/37213; H04N 5/3742
USPC .................................................. 348/241–251
See application file for complete search history.

(56) References Cited

U.S. PATENT DOCUMENTS

| | | | |
|---|---|---|---|
| 2006/0232692 A1* | 10/2006 | Takane ................. | H04N 5/3595 348/248 |
| 2008/0197268 A1* | 8/2008 | Kameda ............ | H01L 27/14623 250/208.1 |
| 2009/0091641 A1* | 4/2009 | Hattori ................... | H04N 5/361 348/241 |
| 2011/0019036 A1* | 1/2011 | Okado ................... | H04N 5/361 348/243 |

FOREIGN PATENT DOCUMENTS

JP     4179701 B2    11/2008
JP     2009-94675 A   4/2009

\* cited by examiner

*Primary Examiner* — Trung Diep
(74) *Attorney, Agent, or Firm* — Westerman, Hattori, Daniels & Adrian, LLP

(57) ABSTRACT

An imaging device includes a solid-state imaging device configured to include a plurality of pixels, the solid-state imaging device outputting subject data according to a pixel signal output by the pixel of an image region on which subject light is incident and optical black (OB) data according to the pixel signal output by the pixel of a constantly shielded OB region of a plurality of columns or rows located on an end of the image region as image data, and an imaging processing unit configured to output pre-processed image data obtained by performing black level correction on partial subject data included in the image data using the same OB data included in the image data output by the solid-state imaging device.

9 Claims, 14 Drawing Sheets

PRIOR ART

IMAGING DEVICE

BACKGROUND OF THE INVENTION

Field of the Invention

The present invention relates to an imaging device. Priority is claimed on Japanese Patent Application No. 2013-186472, filed Sep. 9, 2013, the content of which is incorporated herein by reference.

Description of Related Art

Recently, the number of pixels of a solid-state imaging device in an imaging device such as a digital camera has increased year by year according to an increase in resolution of images to be captured. In general, the solid-state imaging device performs raster scanning and sequentially outputs signals (hereinafter referred to as "pixel signals") of pixels in a horizontal direction (lateral direction) for an image. Because of this, in the image processing device provided in the imaging device and configured to process an image output by the solid-state imaging device, a storage capacity of the line memory for temporarily storing pixel signals of the horizontal direction output by the solid-state imaging device in a number of rows necessary for image processing also increases. An increase in the storage capacity of the line memory in the image processing device is a factor which increases a circuit scale of the imaging device.

For example, as in the publication of Japanese Patent No. 4179701, technology of the image processing device for performing image processing on one image through a plurality of separate operations is disclosed. In the technology disclosed in the publication of Japanese Patent No. 4179701, a pixel signal output from the solid-state imaging device is temporarily stored in a frame memory provided outside the image processing device and then one image is generated through a plurality of image processing operations while pixel signals necessary for the processing are read from the frame memory. For example, in the technology disclosed in the publication of Japanese Patent No. 4179701, as shown in FIG. 14A, the entire region of one image is divided into two regions, image processing is performed on one (left) half region in first image processing, and image processing is performed on the other (right) half region in the second image processing.

In the technology disclosed in the publication of Japanese Patent No. 4179701, one image is divided into a plurality of blocks and image processing is performed through operations equal in number to the division blocks, so that one image can be generated in the storage capacity of the line memory which is less than the number of pixels of the horizontal direction in which the solid-state imaging device performs an output operation.

In a pixel unit of a solid-state imaging device provided in an imaging device, there is an optical black region (hereinafter referred to as an "OB region") of a plurality of columns or rows arranged on an end of an image region and constantly shielded. In photographing in the imaging device, image processing (hereinafter referred to as "black level correction") for correcting a change in a black level represented by a pixel signal output by each pixel within the image region is performed based on a signal (hereinafter referred to as an "OB pixel signal") of a pixel of the OB region. In general, in the pixel unit of the solid-state imaging device, the OB region includes a sub OB region of a horizontal direction (hereinafter referred to as an "HOB region") and a sub OB region of a vertical direction (hereinafter referred to as a "VOB region"). The HOB region refers to a sub region in which a pixel located on either of the left and right of the image region and configured to output an OB pixel signal to be used for the black level correction of the horizontal direction of the image is arranged. The VOB region refers to a sub region in which in which a pixel located on either end of the top and bottom of the image region and configured to output an OB pixel signal to be used for the black level correction of the vertical direction (longitudinal direction) of the image is arranged. In FIG. 14B, an example of an image including an OB pixel signal output by a solid-state imaging device in which the HOB region is arranged on the left end of the image region and the VOB region is arranged on the upper end of the image region is shown.

The case in which the technology disclosed in the publication of Japanese Patent No. 4179701 is applied to the image and black level correction is performed by dividing the entire region of one image into two regions is considered. In this case, as shown in FIG. 14B, the HOB region is included in a left half region on which the black level correction is performed through a first operation, but no HOB region is included in a right half region on which the black level correction is performed in a second operation.

In addition, as disclosed in the publication of Japanese Unexamined Patent Application, First Publication No. 2009-094675, a solid-state imaging device with two HOB regions that are a HOB region corresponding to the image region of the left half and another HOB region corresponding to the image region of the right half is also implemented. In the solid-state imaging device of a configuration disclosed in the publication of Japanese Unexamined Patent Application, First Publication No. 2009-094675, it is possible to perform black level correction on each of the left and right regions even when the entire region of one image is divided into two regions.

SUMMARY OF THE INVENTION

According to a first aspect of the present invention, an imaging device includes: a solid-state imaging device configured to have a plurality of pixels, the solid-state imaging device outputting subject data according to a pixel signal output by the pixel of an image region on which subject light is incident and optical black (OB) data according to the pixel signal output by the pixel of a constantly shielded OB region of a plurality of columns or rows located on an end of the image region as image data; and an imaging processing unit configured to output pre-processed image data obtained by performing black level correction on partial subject data included in the image data using the same OB data included in the image data output by the solid-state imaging device.

According to a second aspect of the present invention, in the imaging device according to the first aspect, the imaging processing unit may include: a data extracting unit configured to extract the OB data common in the subject data included in the image data output by the solid-state imaging device as extraction OB data and output each Of the subject data and the extraction OB data included in the image data, and a pre-processing unit configured to include a line memory configured to hold an amount of subject data which is less than a data amount of the subject data of a first direction in the image region and output the pre-processed image data obtained by performing the black level correction based on the extraction OB data for the subject data output from the data extracting unit and held in the line memory. The data extracting unit may divide the image region within a range of the data amount of the subject data capable of being held by the line memory provided in the pre-processing unit and outputs the subject data and the extraction OB data of the divided image region to the pre-processing unit.

According to a third aspect of the present invention, in the imaging device according to the second aspect, OB regions may be located on one or both ends in a second direction orthogonal to the first direction in the image region. The data extracting unit may divide the image region so that image region divisions are arranged in the first direction and extract the OB data within the OB region located on at least one end in the second direction corresponding to the overlap region in which the image region divisions overlap as the extraction OB data to be commonly used when the pre-processing unit performs the black level correction on the subject data.

According to a fourth aspect of the present invention, in the imaging device according to the second or third aspect, OB regions may be located on one or both ends in the first direction in the image region. The data extracting unit may divide the image region so that image region divisions are arranged in the first direction and extract the OB data within the OB region located on at least one end in the first direction as the extraction OB data to be commonly used when the pre-processing unit performs black level correction on the subject data.

According to a fifth aspect of the present invention, in the imaging device according to any one of the second to fourth aspects, the imaging device may further include: a storage unit configured to store at least the pre-processed image data. The data extracting unit may divide the image region within the range of the data amount of the subject data capable of being held by the line memory, output the subject data and the extraction OB data of a first image region on which the pre-processing unit is able to perform the black level correction to the pre-processing unit, and output the subject data and the extraction OB data of a second image region on which the pre-processing unit has not performed the black level correction and which is different from the first image region as original image data. The pre-processing unit may output the pre-processed image data obtained by performing the black level correction based on the extraction OB data for the subject data of the first image region. The imaging processing unit may further include: a first data transfer unit configured to transfer the pre-processed image data to the storage unit; and a second data transfer unit configured to transfer the original image data to the storage unit.

According to a sixth aspect of the present invention, in the imaging device according to the fifth aspect, the imaging processing unit may further include: a data acquiring unit configured to acquire original image data stored in the storage unit. The data extracting unit may output the subject data and the extraction OB data of the first image region or the subject data and the extraction OB data included in the original image data acquired by the data acquiring unit to the pre-processing unit.

According to a seventh aspect of the present invention, in the imaging device according to the sixth aspect, in the first operation, the imaging processing unit may transfer first pre-processed image data after the pre-processing unit performs the black level correction based on the extraction OB data for the subject data of the first image region to the storage unit through the first data transfer unit and transfer the original image data to the storage unit through the second data transfer unit. In a second operation after the first operation is completed, the data acquiring unit may acquire the original image data stored in the storage unit, the data extracting unit may output the subject data and the extraction OB data of the second image region included in the original image data to the pre-processing unit, and the pre-processing unit may transfer second pre-processed image data obtained by performing the black level correction based on the extraction OB data for the subject data of the second image region to the storage unit through the first data transfer unit.

According to an eighth aspect of the present invention, in the imaging device according to any one of the second to fourth aspects, the imaging device may include: a plurality of imaging processing units; and a storage unit configured to store the pre-processed image data output from the plurality of imaging processing units. Each imaging processing unit may further include: a data transfer unit configured to transfer the pre-processed image data to the storage unit. The data extracting unit provided in each imaging processing unit may divide the image region into regions different from those of the image region divided by the data extracting unit provided in another imaging processing unit in a range of a data amount of the subject data capable of being held by the line memory provided in a corresponding pre-processing unit, and output the subject data and the extraction OB data of the divided image region to the pre-processing unit. The pre-processing unit provided in each imaging processing unit may output the pre-processed image data obtained by performing the black level correction based on the extraction OB data for the subject data of the image region divided by a corresponding data extracting unit. The data transfer unit provided in each imaging processing unit may transfer the pre-processed image data output from the corresponding pre-processing unit to the storage unit.

According to a ninth aspect of the present invention, in the imaging device according to the eighth aspect, each imaging processing unit may simultaneously execute the black level correction based on the extraction OB data for the subject data of a corresponding image region through the pre-processing unit and transfer pre-processed image data to the storage unit through the data transfer unit.

According to a tenth aspect of the present invention, in the imaging device according to the ninth aspect, a plurality of storage units may be provided to store the pre-processed image data output from a corresponding imaging processing unit. Each imaging processing unit may further include a communication unit configured to transmit and receive the pre-processed image data stored in each storage unit.

According to an eleventh aspect of the present invention, in the imaging device according to the tenth aspect, after each imaging processing unit transfers the pre-processed image data to the corresponding storage unit, any one communication unit may transfer the pre-processed image data stored in each storage unit to any one corresponding storage unit.

DETAILED DESCRIPTION OF THE INVENTION

First Embodiment

Figure 1:
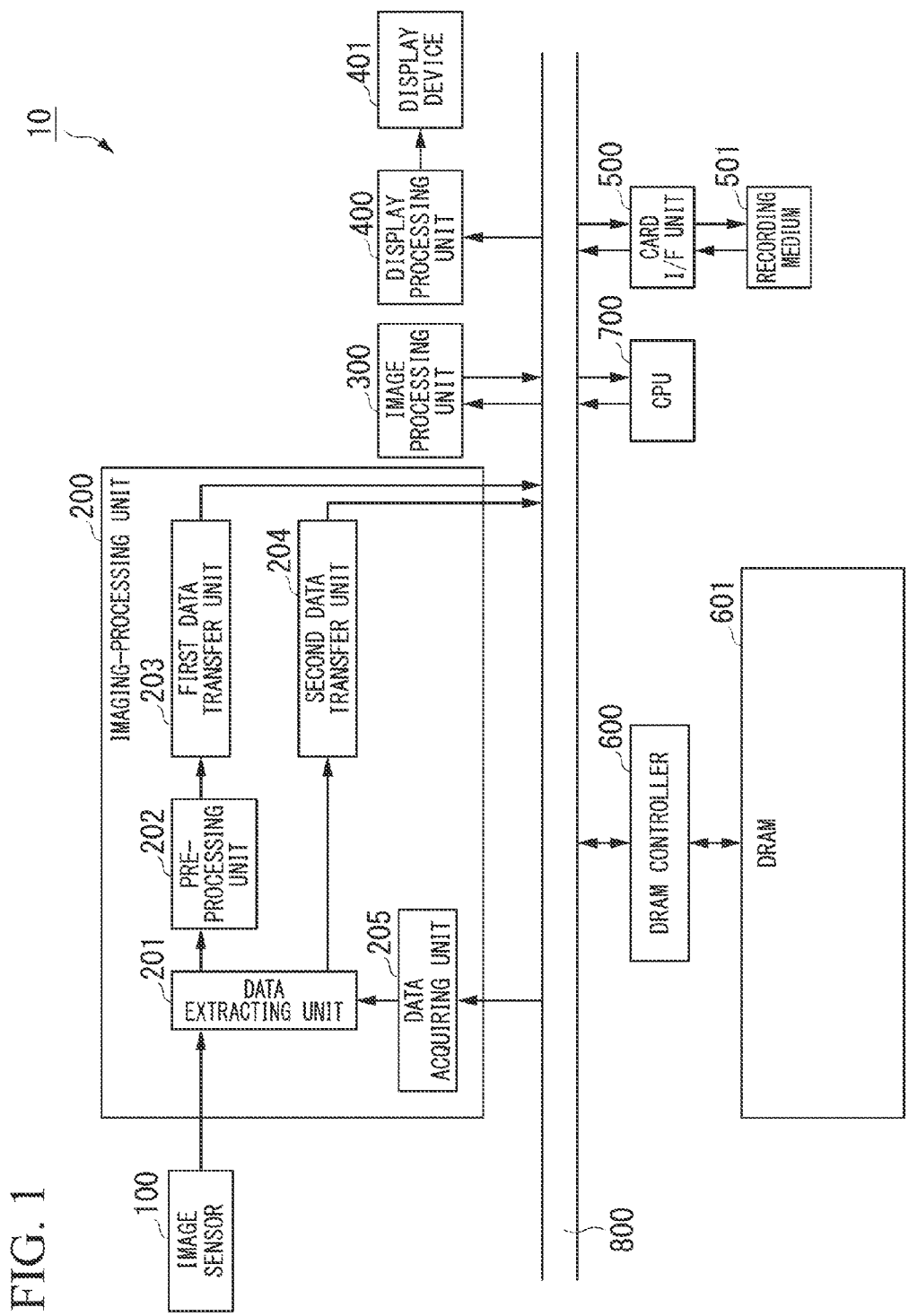
FIG. 1 is a block diagram showing a schematic configuration of an imaging device according to a first embodiment of the present invention.

Hereinafter, the embodiment of the present invention will be described with reference to the drawings. FIG. 1 is a block diagram showing a schematic configuration of an imaging device in the first embodiment. The imaging device 10 shown in FIG. 1 includes an image sensor 100, an imaging processing unit 200, an image processing unit 300, a display processing unit 400, a display device 401, a card interface (I/F) unit 500, a recording medium 501, a dynamic random access memory (DRAM) controller 600, a DRAM 601, and a central processing unit (CPU) 700. The imaging processing unit 200 within the imaging device 10 includes a data extracting unit 201, a pre-processing unit 202, a first data transfer unit 203, a second data transfer unit 204, and a data acquiring unit 205.

Each of the imaging processing unit 200, the image processing unit 300, the display processing unit 400, the card I/F unit 500, the DRAM controller 600, and the CPU 700 within the imaging device 10 is connected via the data bus 800, and, for example, reads data from the DRAM 601 connected to the DRAM controller 600 via direct memory access (DMA) and writes data to the DRAM 601.

The image sensor 100 is a solid-state imaging device represented by a charge coupled device (CCD) image sensor or a complementary metal-oxide semiconductor (CMOS) image sensor for photoelectrically converting an optical image of a subject imaged through a lens (not shown). The image sensor 100 includes an optical black region (OB region) of a plurality of columns or rows located on an end of an image region in which pixels on which subject light is incident are arranged in a pixel unit and constantly shielded to perform black level correction. The image sensor 100 performs raster scanning on all pixels including pixels of the OB region provided in the image sensor 100 itself, and sequentially outputs a signal (OB pixel signal) of a shielded pixel and a pixel signal of a pixel on which subject light is incident in the horizontal direction for an image as image data to the imaging processing unit 200. In the following description, when the image data of the OB pixel signal of the shielded pixel and the image data of the pixel signal of the pixel on which the subject light is incident are represented differently, the image data according to the OB pixel signal is referred to as "OB data," and a pixel signal according to the subject light is referred to as "subject data."

The imaging processing unit 200 fetches image data input from the image sensor 100, divides the fetched image data into the OB data and the subject data, and performs pre-processing including the black level correction based on the OB data for the subject data. The imaging processing unit 200 transfers (writes) the subject data of the pre-processing result to the DRAM 601 via the DRAM controller 600.

A data amount of image data capable of being pre-processed by the imaging processing unit 200, that is, a data amount of the horizontal direction for the image, is less than a data amount of a sum of the OB data and the subject data output by the image sensor 100 as a data amount of one row. Because of this, the imaging processing unit 200 transfers (writes) subject data which has not been pre-processed to the DRAM 601 via the DRAM controller 600 without change, that is, without performing pre-processing. At this time, the imaging processing unit 200 also transfers (writes) OB data corresponding to subject data which is not capable of being pre-processed to the DRAM 601 together. Then, after the pre-processing of an amount of data capable of being pre-processed is completed, the imaging processing unit 200 acquires the subject data which has been stored in the DRAM 601 without change and has not been pre-processed and the corresponding OB data. The imaging processing unit 200 performs pre-processing including the black level correction based on the corresponding OB data for the acquired subject data and transfers (writes) the pre-processed data to the DRAM 601 again. That is, when image data of a data amount of the horizontal direction which is not capable of being pre-processed has been input, the imaging processing unit 200 performs pre-processing including the black level correction based on the corresponding OB data for all input subject data through a plurality of separate operations in a range of an amount of data capable of being pre-processed.

The data extracting unit 201 divides the input image data into OB data and subject data and selects components of output destinations of the subject data and the corresponding OB data. More specifically, the data extracting unit 201 divides the input image data into the OB data and the subject data by extracting the OB data from the image data input from the image sensor 100 and the image data input from the data acquiring unit 205. Then, the data extracting unit 201 selects either or both of the pre-processing unit 202 and the second data transfer unit 204 as the output destination of the subject data. Then, the data extracting units 201 outputs the subject data and the corresponding OB data to the selected output destination(s).

The pre-processing unit 202 performs various pre-processing such as black level correction for correcting a change in a black level based on the corresponding OB data for the subject data input from the data extracting unit 201, defect correction, shading correction, and pixel defect correction on the subject data input from the data extracting unit 201. The pre-processing unit 202 then outputs the subject data (hereinafter referred to as "pre-processed image data") of the processing result to the first data transfer unit 203. The configuration of the pre-processing unit 202 or a processing method and operation including the black level correction in the pre-processing unit 202 are similar to a configuration or a processing method and operation of a pre-processing unit provided in the conventional imaging device. Accordingly, a detailed description related to the configuration of the pre-processing unit 202 and the processing method and operation including the black level correction will be omitted here.

The first data transfer unit 203 stores (writes) pre-processed image data input from the pre-processing unit 202, for example, in (to) the DRAM 601 connected to the DRAM controller 600 through DMA. Because a configuration of the first data transfer unit 203 or an operation of storing (writing) pre-processed image data in (to) the DRAM 601 through the DMA is similar to a normal configuration or operation in which data is stored through the DMA, a detailed description thereof will be omitted here. A method in which the first data transfer unit 203 stores (writes) the pre-processed image data in (to) the DRAM 601 may be a method other than the DMA.

The second data transfer unit 204 stores (writes) OB data corresponding to the subject data input from the data extracting unit 201, that is, the subject data which has not been pre-processed by the pre-processing unit 202, and OB data corresponding to the subject data which has not been pre-processed input from the data extracting unit 201, for example, in (to) the DRAM 601 connected to the DRAM controller 600 through DMA. In the following description, the subject data which has not been pre-processed and corresponding OB data are collectively referred to as "original image data." Because a configuration of the second data transfer unit 204 or an operation of storing (writing) original image data in (to) the DRAM 601 through the DMA is similar to a normal configuration or operation in which data is stored through the DMA as in the first data transfer unit 203, a detailed description thereof will be omitted here. A method in which the second data transfer unit 204 stores (writes) the original image data in (to) the DRAM 601 may be a method other than the DMA as in the first data transfer unit 203.

The data acquiring unit 205 acquires (reads) the image data stored in the DRAM 601, for example, via the DRAM controller 600 through the DMA, and outputs the acquired image data to the data extracting unit 201. The image data acquired by the data acquiring unit 205, for example, may be pre-processed image data stored by the first data transfer unit 203 or image data stored in the DRAM 601 after image processing is performed by the image processing unit 300 as well as original image data stored by the second data transfer unit 204.

The image processing unit 300 acquires (reads) pre-processed image data stored in the DRAM 601, and generates display image data or recording image data by performing various image processing such as a noise cancelation process, distortion aberration correction, a YC conversion process, a resizing process, a Joint Photographic Experts Group (JPEG) compression process, and a moving image compression process such as a Moving Picture Experts Group (MPEG) compression process or an H.264 compression process on the acquired pre-processed image data. Then, the image processing unit 300 stores (writes) the generated display image data or recording image data in (to) the DRAM 601 again.

The image processing unit 300 acquires (reads) the recording image data stored in the DRAM 601 and generates the display image data by performing various types of image processing such as a JPEG decompression process and a moving image decompression process such as an MPEG decompression process or an H.264 decompression process. Then, the image processing unit 300 stores (writes) the generated display image data in (to) the DRAM 601 again.

The display processing unit 400 acquires (reads) the display image data stored in the DRAM 601, and performs a display process such as a process of superimposing on-screen display (OSD) display data on the acquired display image data. Then, image data after the display process is output to the display device 401.

The display device 401 is a display device such as a thin film transistor (TFT) liquid crystal display (LCD) or an organic electro luminescence (EL) display. The display device 401 displays an image according to image data after the display process output from the display processing unit 400.

The display device 401 may be a display device such as an electronic view finder (EVF) or an external display such as a television. In addition, although the display device 401 also serves as a component of the imaging device 10 in FIG. 1, the display device 401 may be a configuration detachable from the imaging device 10.

The card I/F unit 500 acquires (reads) the recording image data recorded on the DRAM 601 and causes the acquired recording image data to be recorded on the recording medium 501. In addition, the card I/F unit 500 reads the image data recorded on the recording medium 501 and transfers (writes) the read image data to the DRAM 601.

The recording medium 501 is a recording medium such as a Secure Digital (SD) memory card or CompactFlash (CF) (registered trademarks), and records recording image data output from the card I/F unit 500. In addition, recorded image data is read by the card I/F unit 500. Although the recording medium 501 also serves as a component of the imaging device 10 in FIG. 1, the recording medium 501 is a configuration detachable from the imaging device 10.

The DRAM controller 600 controls a process of storing (writing) data in (to) the connected DRAM 601 and acquiring (reading) data from the DRAM 601 according to an access request from a plurality of components within the imaging device 10 connected to the data bus 800 to the DRAM 601, for example, an access request of the DMA.

The DRAM 601 is a memory (storage unit) for which access is controlled by the DRAM controller 600. The DRAM 601 temporarily stores various data in a processing process of each component within the imaging device 10.

The CPU 700 controls a component of the imaging device 10, that is, the overall imaging device 10. For example, the CPU 700 controls an operation of each component within the imaging device 10 according to a photographing operation or a reproducing operation in the imaging device 10. For example, when the imaging device 10 performs a photographing operation, the CPU 700 controls the start of outputting of image data from the image sensor 100 and the start of fetching of image data by the imaging processing unit 200.

The CPU 700 performs the control of extraction of the subject data and the corresponding OB data and selection of output destinations by the data extracting unit 201 within the imaging processing unit 200, the extraction of OB data by the data extracting unit 201, the setting of a transfer of image data by the first data transfer unit 203 and the second data transfer unit 204, or the setting of the data acquiring unit 205.

Through this configuration, in the imaging device 10 according to the first embodiment, it is possible to perform various pre-processing including black level correction based on OB data directly for subject data included in the fetched image data while fetching image data output from the image sensor 100 in real time. In addition, in the imaging device 10 according to the first embodiment, the data acquiring unit 205 acquires original image data stored in the DRAM 601, and therefore various pre-processing including black level correction based on the corresponding OB data can be performed on the subject data included in the original image data storage in the DRAM 601. That is, in the imaging device 10 according to the first embodiment, it is possible to perform various pre-processing including proper black level correction based on the corresponding OB data in addition to the subject data input in real time.

Next, an example of an operation of performing pre-processing (black level correction based on OB data) on the subject data included in the image data output from the image sensor 100 in the imaging device 10 will be described. In the following description, the case in which the number of pixels of the horizontal direction of the image sensor 100 is 10000. That is, the case in which the image sensor 100 captures an image of a width of 10000 pixels and the pre-processing unit 202 includes a line memory of a storage capacity of 6000 pixels in the horizontal direction, will be described. That is, an operation of a method of performing pre-processing of the black level correction on the subject data of one row in the case of a configuration in which a data amount of image data of the horizontal direction output by the image sensor 100 for every row is greater than a data amount of image data of one row capable of being held by the line memory provided in the pre-processing unit 202 and it is difficult to hold all subject data of one row in the line memory will be described. In the following description, a data amount of OB data is not considered for ease of description.

When a data amount of the input subject data is greater than an amount of data capable of being handled by the line memory provided in the pre-processing unit 202, that is, when a data amount of the subject data capable of being pre-processed by the imaging processing unit 200 is less than a data amount of the subject data output by the image sensor 100 as a data amount of one row, the imaging device 10 pre-processes all input subject data through a plurality of separate operations in a range of a data amount (here, 6000 pixels) in which pre-processing can be performed as described above. In the following description, for ease of description, the case in which subject data input from the image sensor 100 is pre-processed in halves through two separate operations will be described.

The black level correction on the subject data is black level correction of the horizontal direction to be performed based on OB data (hereinafter referred to as "HOB data") of an OB region (HOB region) of the horizontal direction located in the horizontal direction of the image and black level correction of the vertical direction to be performed based on OB data (hereinafter referred to as "VOB data") of an OB region (VOB region) of the vertical direction located in the vertical direction (longitudinal direction) of the image.

A concept in which each of the black level correction of the horizontal direction and the black level correction of the vertical direction is performed through two separate operations in the imaging device 10 according to the first embodiment will be described.

Figure 2:
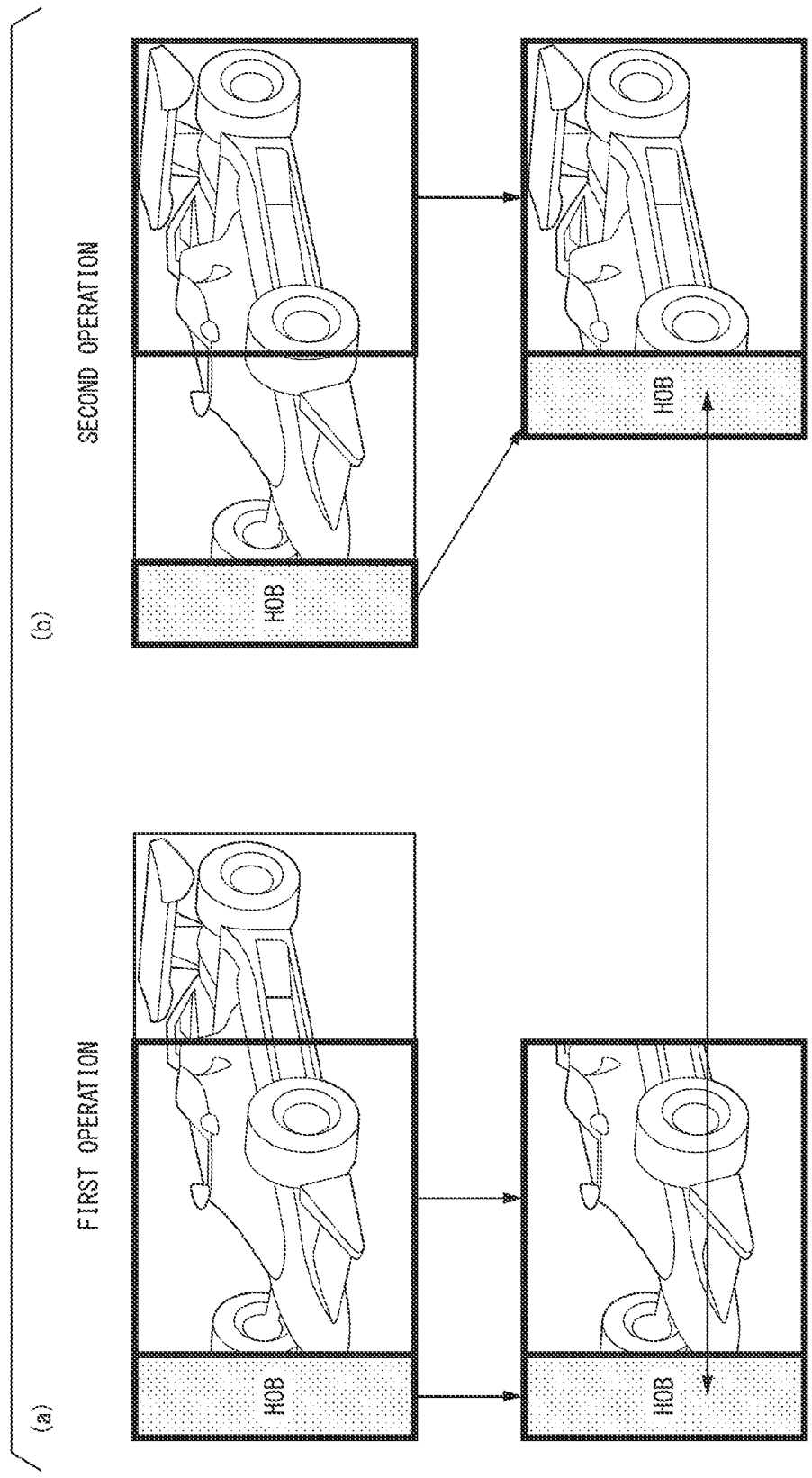
FIG. 2 is a diagram showing a concept in which black level correction of a horizontal direction is performed by the imaging device according to the first embodiment.
Figure 3:
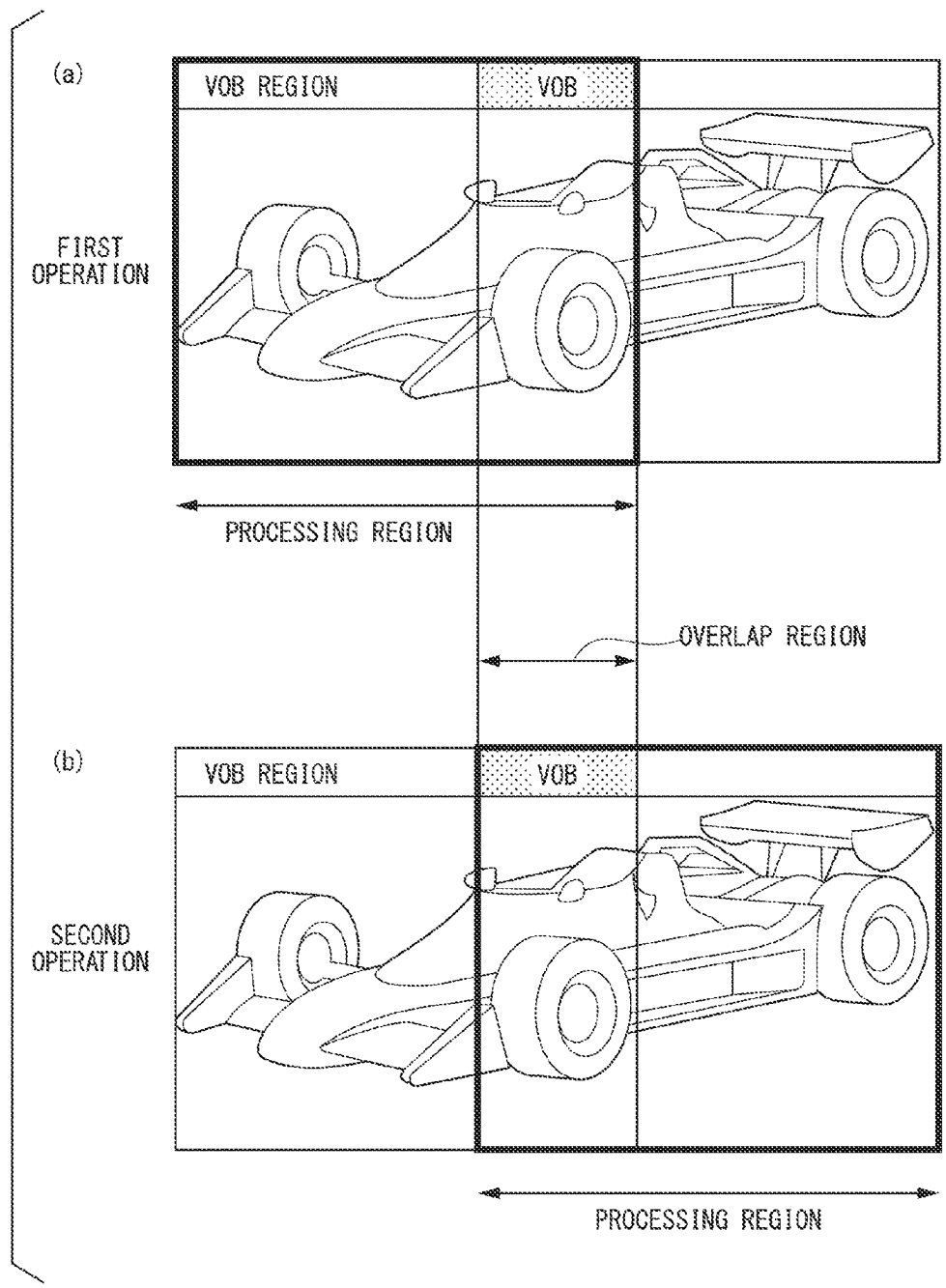
FIG. 3 is a diagram showing a concept in which the black level correction of a vertical direction is performed according to the imaging device according to the first embodiment.

FIG. 2 is a diagram showing a concept in which the black level correction of the horizontal direction is performed by the imaging device 10 according to the first embodiment. In addition, FIG. 3 is a diagram showing a concept in which the black level correction of the vertical direction is performed by the imaging device 10 according to the first embodiment.

First, using FIG. 2, a concept in which the imaging device 10 performs the black level correction of the horizontal direction through two separate operations will be described. FIG. 2 is an example in which the HOB region is located on a left end of the image region in the pixel unit of the image sensor 100.

In the black level correction of the horizontal direction in the imaging device 10, only an image region within the pixel unit of the image sensor 100 is divided and the black level correction is performed on subject data of each image region division based on the HOB data of the same HOB region. That is, the black level correction of the horizontal direction on the subject data is performed using common HOB data between image region divisions.

More specifically, in a first operation of the black level correction of the horizontal direction in the imaging device 10, as shown in (a) of the FIG. 2, the HOB data of the HOB region is extracted, and the black level correction of the horizontal direction is performed on the subject data of one (left) half obtained by dividing the image region based on the extracted HOB data. In addition, in a second operation of the black level correction of the horizontal direction in the imaging device 10, as shown in (b) of the FIG. 2, the black level correction of the horizontal direction is performed on the subject data of the other (right) half obtained by dividing the image region based on the extracted HOB data.

In this manner, in the black level correction of the horizontal direction in the imaging device 10, the black level correction is performed on the subject data of each image region division using the HOB data of the same HOB region. In the imaging device 10, the data extracting unit 201 performs a process of extracting HOB data from the image data input from the image sensor 100 and dividing the image region, and the pre-processing unit 202 performs the black level correction of the horizontal direction on the subject data of the divided image region based on the HOB data input from the data extracting unit 201.

Next, using FIG. 3, a concept in which the imaging device 10 performs the black level correction of the vertical direction through two separate operations will be described. FIG. 3 is an example in which the VOB region is located on an upper end of the image region in the pixel unit of the image sensor 100.

An image having disharmony in a boundary part along which processing is divided at the time of pre-processing to be performed by dividing an image region into a plurality of divisions as well as the black level correction is considered. Because of this, when pre-processing is actually performed through a plurality of separate operations, generally a process is performed by providing a region overlapping the subject data used in each process, that is, an overlap region. In the black level correction of the vertical direction by the imaging device 10, the black level correction on subject data of each image region division is performed based on the VOB data within the VOB region corresponding to this overlap region. That is, the black level correction of the vertical direction on the subject data is performed using VOB data within a common overlap region between image region divisions.

More specifically, in a first operation of the black level correction of the vertical direction in the imaging device 10, as shown in (a) of the FIG. 3, the VOB data of the VOB region located within the overlap region within the VOB region located on the entire upper side of the image region is extracted, and the black level correction of the vertical direction on the subject data of one (left) half obtained by dividing the image region is performed based on the extracted VOB data. In addition, in a second operation of the black level correction of the vertical direction in the imaging device 10, as shown in (b) of the FIG. 3, the black level correction of the vertical direction on the subject data of the other (right) half obtained by dividing the image region is performed based on the VOB data of the VOB region located within the extracted overlap region.

In this manner, in the black level correction of the vertical direction in the imaging device 10, the black level correction is performed on the subject data of each image region division using the VOB data of the VOB region located within the same overlap region. In the imaging device 10, the data extracting unit 201 performs a process of extracting VOB data from the image data input from the image sensor 100 and dividing the image region, and the pre-processing unit 202 performs the black level correction of the vertical direction on the subject data of the divided image region based on the VOB data input from the data extracting unit 201.

Although not described in the above-described black level correction of the horizontal direction in the imaging device 10, the overlap region may be provided in each boundary part along which the image region is divided even when the black level correction of the horizontal direction is performed. In this manner, it is possible to eliminate disharmony of an image in the boundary part along which processing is divided by providing the overlap region at the time of the pre-processing to be performed by dividing the image region into a plurality of divisions as well as the black level correction.

Next, an example of an actual operation of each of the black level correction of the horizontal direction and the black level correction of the vertical direction in the imaging device 10 according to the first embodiment will be described. First, an example of an operation in which the imaging device 10 performs the black level correction of the horizontal direction through two separate operations will be described.

Figure 4:
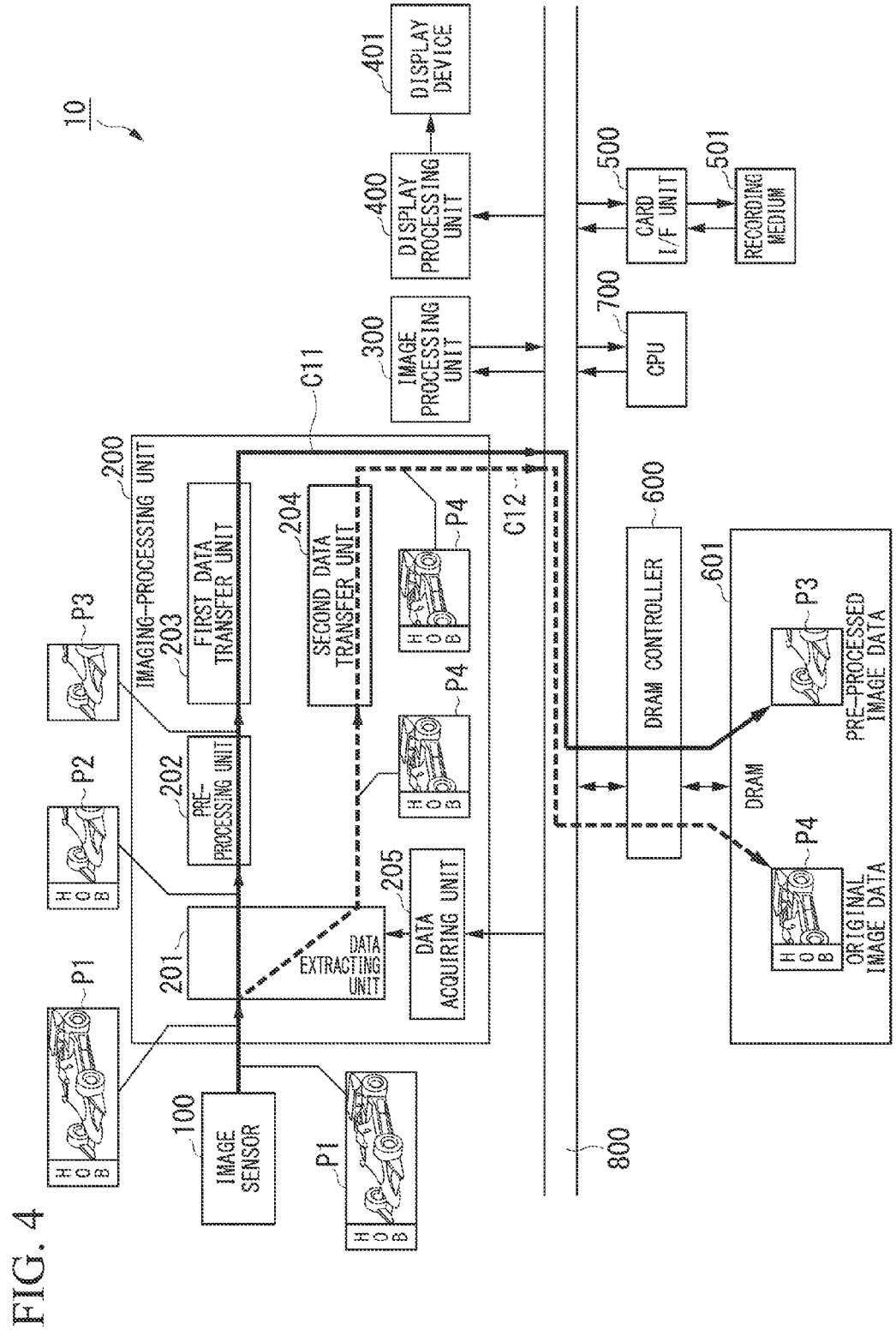
FIG. 4 is a diagram schematically showing an example of a first operation in the black level correction of the horizontal direction by the imaging device according to the first embodiment.
Figure 5:
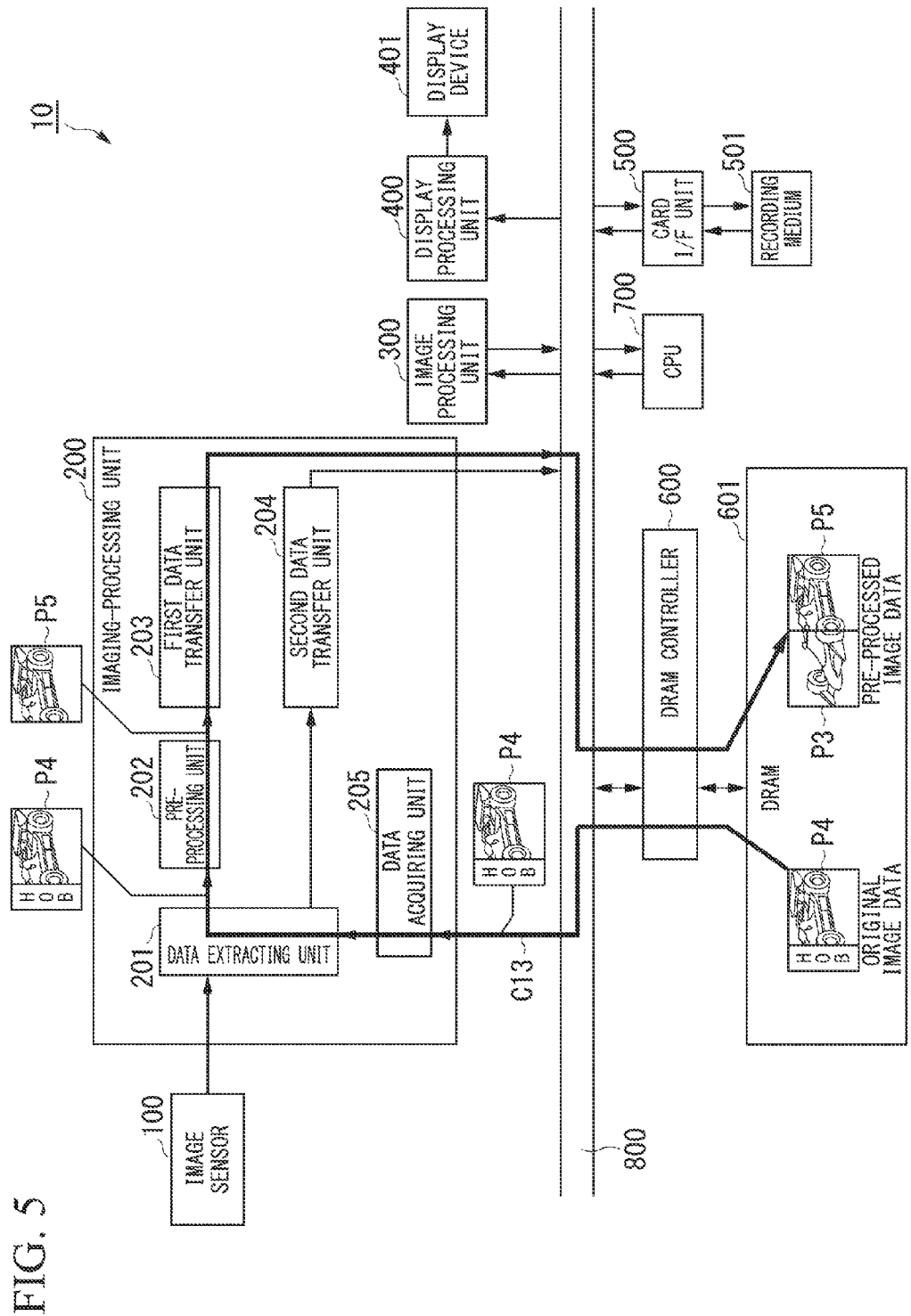
FIG. 5 is a diagram schematically showing an example of a second operation in the black level correction of the horizontal direction by the imaging device according to the first embodiment.

Each of FIGS. 4 and 5 is a diagram schematically showing an example of an operation of the black level correction of the horizontal direction by the imaging device 10 according to the first embodiment. In FIG. 4, an example of a first operation in which the imaging device 10 performs pre-processing (black level correction of the horizontal direction based on the HOB data) on the subject data of one (left) half input from the image sensor 100 is shown. In addition, in FIG. 5, an example of a second operation in which the imaging device 10 performs pre-processing (black level correction of the horizontal direction based on the HOB data) on the subject data of the other (right) half input from the image sensor 100 is shown.

<First Operation>

In the first operation (an operation of a first path), pre-processed image data obtained by performing black level correction of the horizontal direction on the subject data output from the image sensor 100 in real time is transferred (written) to the DRAM 601 based on the HOB data of the HOB region located on a left end of the pixel unit of the image sensor 100. In addition, in the operation of the first path, the subject data on which the black level correction of the horizontal direction is not capable of being performed is transferred (written) to the DRAM 601 without change, and the HOB data corresponding to the subject data is transferred (written) to the DRAM 601. In FIG. 4, each data path in the first operation (the operation of the first path) is shown on the block diagram of the imaging device 10 shown in FIG. 1.

First, in the operation of the first path, in a path of image data of a path C11 shown in FIG. 4, pre-processed image data obtained by performing black level correction of the horizontal direction in real time on the subject data is transferred (written) to the DRAM 601. More specifically, in the operation of the first path, the image sensor 100 captures one image having a horizontal width of 10000 pixels and outputs subject data of the captured image P1 to the imaging processing unit 200 along with the HOB data. In the imaging processing unit 200, the HOB data and the subject data of the entire region of the image P1 input from the image sensor 100 are fetched, and the fetched HOB data and the fetched subject data of the image P1 are sequentially input to the data extracting unit 201 within the imaging processing unit 200. Then, the data extracting unit 201 extracts the HOB data input along with the subject data of the image P1 and sequentially outputs the extracted HOB data and subject data of an image P2 which is a left half region of the image P1 to the pre-processing unit 202.

The pre-processing unit 202 performs black level correction of the horizontal direction on the subject data of the image P2 sequentially input from the data extracting unit 201 based on the HOB data input from the data extracting unit 201. The pre-processing unit 202 then sequentially outputs the pre-processed image data of the image P3 after the black level correction of the horizontal direction is performed to the first data transfer unit 203. Then, the first data transfer unit 203 transfers (writes) the pre-processed image data of the image P3 sequentially input from the pre-processing unit 202 to the DRAM 601 via the DRAM controller 600. Thereby, the pre-processed image data of the image P3 after the black level correction of the horizontal direction is performed is stored in the DRAM 601.

In addition, in the operation of the first path, in a path of image data of a path C12 shown in FIG. 4, the unchanged subject data and the HOB data corresponding to the subject data are transferred (written) to the DRAM 601.

More specifically, in the operation of the first path, the data extracting unit 201 sequentially outputs the extracted HOB data and the subject data of an image P4 which is a right half region of the image P1 is sequentially output to the second data transfer unit 204. The second data transfer unit 204 transfers (writes) the subject data of the image P4 sequentially input from the data extracting unit 201 and the HOB data corresponding to the subject data as original image data of the image P4 to the DRAM 601 via the DRAM controller 600 without change. Thereby, the subject data of the image P4 of the right half of the image P1 output by the image sensor 100 is stored in the DRAM 601 without change. In addition, the HOB data output by the image sensor 100 is stored in the DRAM 601 without change.

In this manner, in the operation of the first path, pre-processed image data of the image P3 obtained by performing the black level correction of the horizontal direction on the left half region of the image P1 output by the image sensor 100 and subject data and HOB data of the image P4 which is a right half region of the image P1 output by the image sensor 100 are stored in the DRAM 601.

In the operation of the first path, it is possible to store subject data and HOB data of all regions of the image P1 input from the image sensor 100 as original image data of the image P1 in the DRAM 601 when the original image data is stored in the DRAM 601. However, as described above, in the operation of the first path, only the HOB data and the subject data of the image P4 of a right half of the image P1 are stored as the original image data in the DRAM 601. This is because only the subject data of the image P4 which is the right half region of the image P1 on which the black level correction of the horizontal direction has not been performed in the operation of the first path is subjected to the black level correction in the subsequent second operation (an operation of a second path). Thereby, it is possible to reduce the storage capacity of the DRAM 601 and avoid unnecessary pressure on a bus bandwidth of the data bus 800.

<Second Operation>

Thereafter, the imaging device 10 transfers (writes) pre-processed image data obtained by performing black level correction of a horizontal direction based on HOB data for subject data of an image P4, which is subject data of the right half of the image P1 on which the black level correction of the horizontal direction has not been performed input from the image sensor 100 in the first operation (the operation of the first path), to the DRAM 601. In FIG. 5, a data path in the second operation (the operation of the second path) is shown on the block diagram of the imaging device 10 shown in FIG. 1.

In the operation of the second path, in a path of image data of a path C13 shown in FIG. 5, the pre-processed image data obtained by performing the black level correction of the horizontal direction on the subject data of the image P4 stored in the DRAM 601 is transferred (written) to the DRAM 601. More specifically, in the operation of the second path, the data acquiring unit 205 sequentially acquires (reads) original image data of the image P4 stored in the DRAM 601. The data acquiring unit 205 then sequentially outputs the acquired original image data of the image P4 to the data extracting unit 201. Then, the data extracting unit 201 extracts the HOB data from the input original image data of the image P4, and sequentially outputs the extracted HOB data and subject data of the image P4 to the pre-processing unit 202.

When it is difficult to perform the black level correction of the horizontal direction on all the subject data of the image P4, the extracted HOB data and the subject data on which the black level correction of the horizontal direction is not capable of being performed are transferred (written) to the DRAM 601 without change in a path of image data of a path C12 as in the first operation. Thereby, the HOB data and the subject data on which the black level correction of the horizontal direction is not capable of being performed are stored in the DRAM 601 again.

The pre-processing unit 202 performs the black level correction of the horizontal direction on the subject data of the image P4 sequentially input from the data extracting unit 201 based on the HOB data input from the data extracting unit 201, and sequentially outputs the pre-processed image data of an image P5 after the black level correction of the horizontal direction is performed to the first data transfer unit 203. Then, the first data transfer unit 203 transfers (writes) the pre-processed image data of the image P5 sequentially input from the pre-processing unit 202 to the DRAM 601 via the DRAM controller 600. Thereby, the pre-processed image data of the image P5 after the black level correction of the horizontal direction is performed is stored in the DRAM 601.

In this manner, in the operation of the second path, the pre-processed image data of the image P5 obtained by performing the black level correction of the horizontal direction on the image P4 of the right half of the image P1 output by the image sensor 100 stored in the DRAM 601 is stored in the DRAM 601. Thereby, the pre-processed image data (the pre-processed image data of a combination of the image P3 and the image P4) obtained by performing the black level correction of the horizontal direction on the subject data of the entire region of one image P1 having a horizontal width of 10000 pixels captured by the image sensor 100 is stored in the DRAM 601.

In this manner, since the black level correction of the horizontal direction is performed by the imaging device 10 according to the first embodiment, it is possible to divide only an image region within the pixel unit of the image sensor 100 and perform the black level correction on subject data of image region divisions based on the HOB data of the same HOB region, that is, common HOB data.

More specifically, in the first operation (the operation of the first path), the imaging device 10 transfers (writes) pre-processed image data obtained by performing the black level correction of the horizontal direction in real time on subject data of a left half of the image P1 input from the image sensor 100 to the DRAM 601, and transfers (writes) subject data of a right half on which the black level correction of the horizontal direction is not capable of being performed to the DRAM 601 without change. Thereafter, in the second operation (the operation of the second path), the imaging device 10 performs the black level correction of the horizontal direction on all the subject data of one image P1 by transferring (writing) pre-processed image data obtained by performing the black level correction of the horizontal direction on the subject data of the right half of the image P1 on which the black level correction of the horizontal direction has not been performed input from the image sensor 100 in the first operation (the operation of the first path) to the DRAM 601.

Next, an example in which the imaging device 10 performs the black level correction of the vertical direction through two separate operations will be described.

Figure 6:
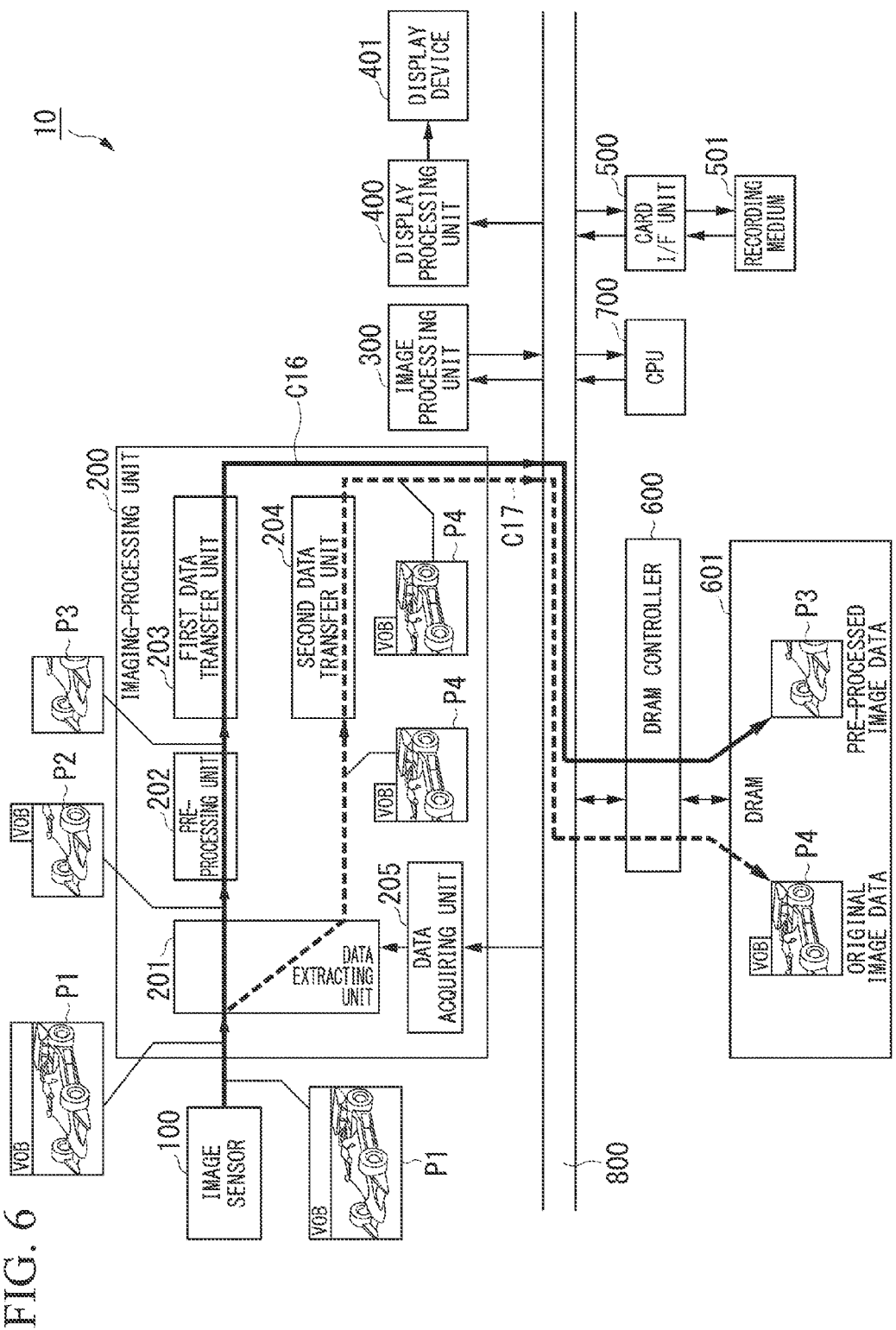
FIG. 6 is a diagram schematically showing an example of a first operation in the black level correction of the vertical direction by the imaging device according to the first embodiment.
Figure 7:
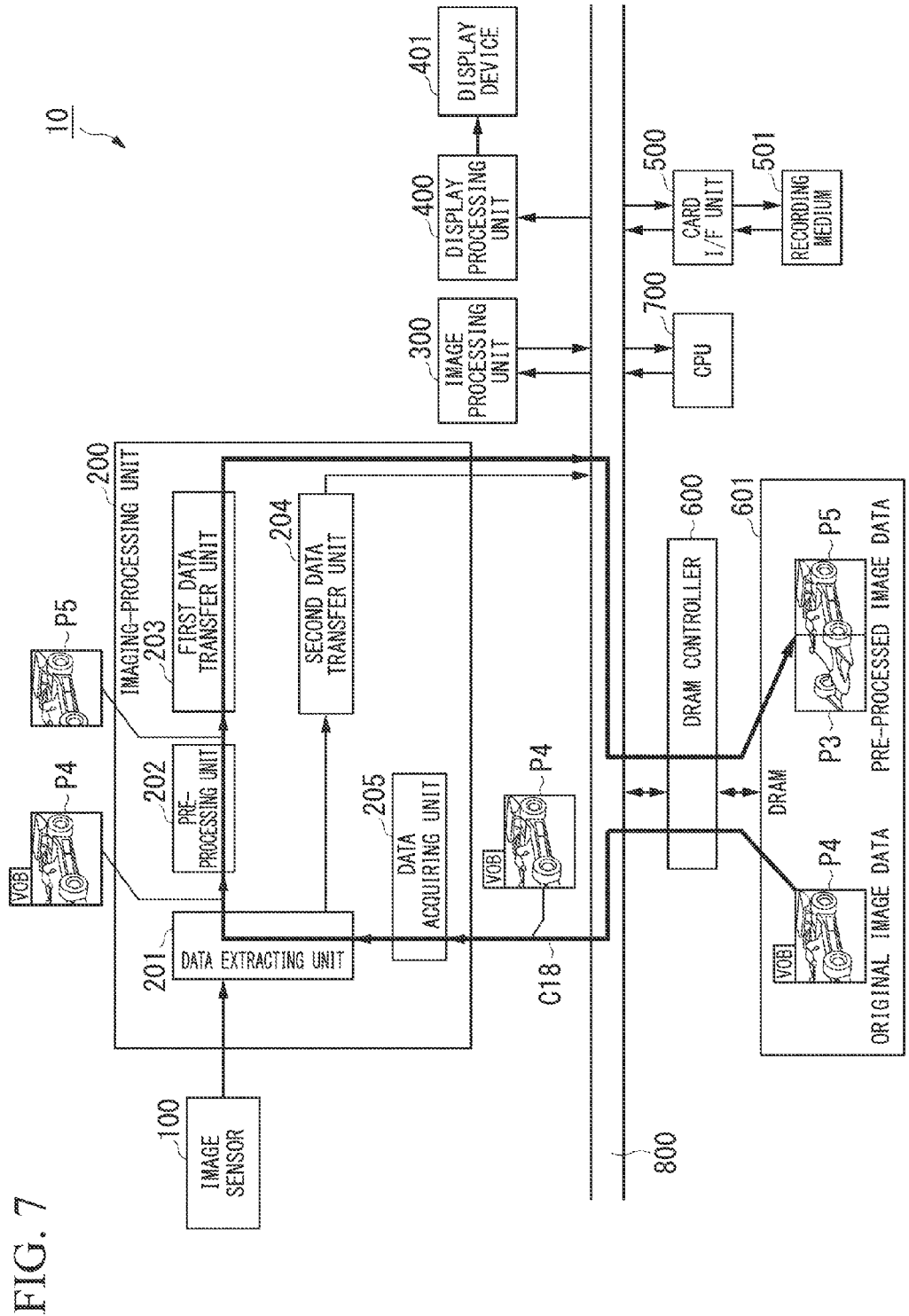
FIG. 7 is a diagram schematically showing an example of a second operation in the black level correction of the vertical direction by the imaging device according to the first embodiment.

Each of FIGS. 6 and 7 is a diagram schematically showing an example of the black level correction of the vertical direction by the imaging device 10 according to the first embodiment. In FIG. 6, an example of the first operation in which the imaging device 10 performs pre-processing (the black level correction of the vertical direction based on VOB data) on the subject data of the one (left) half input from the image sensor 100 is shown. In addition, in FIG. 7, an example of the second operation in which the imaging device 10 performs pre-processing (the black level correction of the vertical direction based on VOB data) on the subject data of the other (right) half input from the image sensor 100 is shown.

<First Operation>

In the first operation (an operation of a first path), pre-processed image data obtained by performing black level correction of the vertical direction on the subject data output from the image sensor 100 in real time is transferred (written) to the DRAM 601 based on VOB data of a VOB region located within an overlap region within the VOB region located on an upper end of the pixel unit of the image sensor 100.

In addition, in the operation of the first path, the subject data on which the black level correction of the vertical direction is not capable of being performed is transferred (written) to the DRAM 601 without change, and the VOB data of the VOB region located within the overlap region corresponding to the subject data is transferred (written) to the DRAM 601. In FIG. 6, each data path in the first operation (the operation of the first path) is shown on the block diagram of the imaging device 10 shown in FIG. 1.

First, in the operation of the first path, in a path of image data of a path C16 shown in FIG. 6, pre-processed image data obtained by performing black level correction of the vertical direction in real time on the subject data is transferred (written) to the DRAM 601. More specifically, in the operation of the first path, the image sensor 100 captures one image having a horizontal width of 10000 pixels and outputs subject data of the captured image P1 to the imaging processing unit 200 along with the VOB data. In the imaging processing unit 200, the VOB data and the subject data of the entire region of the image P1 input from the image sensor 100 are fetched, and the fetched VOB data and the fetched subject data of the image P1 are sequentially input to the data extracting unit 201 within the imaging processing unit 200. Then, the data extracting unit 201 extracts the VOB data of the VOB region within the overlap region from among the VOB data input along with the subject data of the image P1 and sequentially outputs the extracted VOB data and subject data of an image P2 which is a left half region of the image P1 to the pre-processing unit 202.

The pre-processing unit 202 performs black level correction of the vertical direction on the subject data of the image P2 sequentially input from the data extracting unit 201 based on the VOB data input from the data extracting unit 201, and sequentially outputs the pre-processed image data of the image P3 after the black level correction of the vertical direction is performed to the first data transfer unit 203. Then, the first data transfer unit 203 transfers (writes) the pre-processed image data of the image P3 sequentially input from the pre-processing unit 202 to the DRAM 601 via the DRAM controller 600. Thereby, the pre-processed image data of the image P3 after the black level correction of the vertical direction is performed is stored in the DRAM 601.

In addition, in the operation of the first path, in a path of image data of a path C17 shown in FIG. 6, the unchanged subject data and the corresponding VOB data, that is, the VOB data of the VOB region within the overlap region, is transferred (written) to the DRAM 601. More specifically, in the operation of the first path, the data extracting unit 201 sequentially outputs the extracted VOB data and the subject data of an image P4 which is a right half region of the image P1 to the second data transfer unit 204. The second data transfer unit 204 transfers (writes) the subject data of the image P4 sequentially input from the data extracting unit 201 and the corresponding HOB data as original image data of the image P4 to the DRAM 601 via the DRAM controller 600 without change. Thereby, the subject data of the image P4 of the right half of the image P1 output by the image sensor 100 is stored in the DRAM 601 without change. In addition, the VOB data output by the image sensor 100 is stored in the DRAM 601 without change.

In a subsequent second operation (an operation of a second path), when it is difficult to perform the black level correction of the vertical direction on all the subject data of the image P4, the data extracting unit 201 sequentially outputs the VOB data of the VOB region after the start position of the overlap region as the VOB data corresponding to the subject data of the image P4 as well as the VOB data extracted from the VOB region within the overlap region to the second data transfer unit 204. Thereby, in the subsequent second operation (the operation of the second path), it is possible to extract the VOB data of the VOB region within the next overlap region and sequentially output the extracted VOB data and the subject data of the image of the next region to the pre-processing unit 202 in a path similar to a path C16. In a path similar to a path C17, it is possible to re-store the subject data and the corresponding VOB data of the next region on which the black level correction is not capable of being performed in the DRAM 601 without change.

In this manner, in the operation of the first path, as in the operation of the first path of the black level correction of the horizontal direction by the imaging device 10, pre-processed image data of the image P3 obtained by performing the black level correction of the vertical direction on the left half region of the image P1 output by the image sensor 100 and subject data and VOB data of the image P4 which is a right half region of the image P1 output by the image sensor 100 are stored in the DRAM 601.

In the operation of the first path, when original image data is stored in the DRAM 601, the subject data and the VOB data of the entire region of the image P1 input from the image sensor 100 can be stored as the original image data of the image P1 in the DRAM 601. However, as described above, in the operation of the first path, only the VOB data and the subject data of the image P4 of the right half of the image P1 are stored as the original image data in the DRAM 601. The reason for this is similar to that for the black level correction of the horizontal direction by the imaging device 10, and a similar advantageous effect can be obtained.

<Second Operation>

Thereafter, the imaging device 10 transfers (writes) pre-processed image data obtained by performing the black level correction of the vertical direction based on VOB data for subject data of the image P4, which is subject data of the right half of the image P1 on which the black level correction of the vertical direction has not been performed input from the image sensor 100 in the first operation (the operation of the first path), to the DRAM 601. In FIG. 7, a data path in the second operation (the operation of the second path) is shown on the block diagram of the imaging device 10 shown in FIG. 1.

In the operation of the second path, in the path of the image data of a path C18 shown in FIG. 7, the pre-processed image data obtained by performing the black level correction of the vertical direction on the subject data of the image P4 stored in the DRAM 601 is transferred (written) to the DRAM 601. More specifically, in the operation of the second path, the data acquiring unit 205 sequentially acquires (reads) original image data of the image P4 stored in the DRAM 601, and sequentially outputs the acquired original image data of the image P4 to the data extracting unit 201. Then, the data extracting unit 201 extracts the VOB data from the input original image data of the image P4, and sequentially outputs the extracted VOB data and subject data of the image P4 to the pre-processing unit 202.

When it is difficult to perform the black level correction of the vertical direction on all the subject data of the image P4, the extracted VOB data and the subject data on which the black level correction of the vertical direction is not capable of being performed are transferred (written) to the DRAM 601 without change in a path of image data of the path C17 as in the first operation. Thereby, the VOB data and the subject data on which the black level correction of the vertical direction is not capable of being performed is stored in the DRAM 601 again.

The pre-processing unit 202 performs the black level correction of the vertical direction on the subject data of the image P4 sequentially input from the data extracting unit 201 based on the VOB data input from the data extracting unit 201. The pre-processing unit 202 then sequentially outputs the pre-processed image data of an image P5 after the black level correction of the vertical direction is performed to the first data transfer unit 203. Then, the first data transfer unit 203 transfers (writes) the pre-processed image data of the image P5 sequentially input from the pre-processing unit 202 to the DRAM 601 via the DRAM controller 600. Thereby, the pre-processed image data of the image P5 after the black level correction of the vertical direction is performed is stored in the DRAM 601.

In this manner, in the operation of the second path, the pre-processed image data of the image P5 obtained by performing the black level correction of the vertical direction on the image P4 of the right half of the image P1 output by the image sensor 100 stored in the DRAM 601 is stored in the DRAM 601. Thereby, the pre-processed image data (the pre-processed image data of a combination of the image P3 and the image P5) obtained by performing the black level correction of the vertical direction on the subject data of the entire region of one image P1 having a horizontal width of 10000 pixels captured by the image sensor 100 is stored in the DRAM 601.

In this manner, in the black level correction of the vertical direction by the imaging device 10 according to the first embodiment, it is possible to divide only an image region within the pixel unit of the image sensor 100 and perform the black level correction on subject data of image region divisions based on the VOB data of the same VOB region located within the overlap region, that is, common VOB data.

More specifically, in the first operation (the operation of the first path), the imaging device 10 transfers (writes) pre-processed image data obtained by performing the black level correction of the vertical direction in real time on the subject data of a left half of the image P1 input from the image sensor 100 to the DRAM 601, and transfers (writes) subject data of a right half on which the black level correction of the vertical direction is not capable of being performed to the DRAM 601 without change. Thereafter, in the second operation (the operation of the second path), the imaging device 10 performs the black level correction of the vertical direction on all the subject data of one image P1 by transferring (writing) pre-processed image data obtained by performing the black level correction of the vertical direction on the subject data of the right half of the image P1 on which the black level correction of the vertical direction has not been performed input from the image sensor 100 in the first operation (the operation of the first path) to the DRAM 601.

As described above, the black level correction is performed on all the input subject data according to two operations such as first and second operations in the imaging device 10 according to the first embodiment when a data amount of subject data of the horizontal direction output by the image sensor 100 is greater than a data amount of the subject data capable of being held by the line memory provided in the pre-processing unit 202 within the imaging processing unit 200. At this time, in the black level corrections of the horizontal direction and the vertical direction by the imaging device 10 according to the first embodiment, only the image region within the pixel unit of the image sensor 100 is divided and the black level correction is performed on the subject data of image region divisions based on the OB data (common OB data) of the same OB region. Thereby, in the imaging device 10 according to the first embodiment, it is possible to perform good black level correction without disharmony in a boundary part along which the black level correction is divided even when the black level correction is performed by dividing an image output by the image sensor 100 into a plurality of divisions.

That is, in the imaging device 10 according to the first embodiment, it is possible to perform good black level correction in the horizontal and vertical directions for all subject data output from the image sensor 100 even when the data amount of subject data of one row capable of being held by the line memory provided in the pre-processing unit 202 within the imaging processing unit 200 is less than a data amount of subject data output by the image sensor 100 for every row. Thereby, it is possible to execute the black level correction of the horizontal and vertical directions corresponding to the image sensor 100 in which the number of pixels has increased without increasing a circuit scale of the imaging device 10, particularly, a storage capacity of the line memory. In other words, it is possible to cope with an increase of the number of pixels of the image sensor in a small circuit scale.

In an example of an operation of the black level correction by the imaging device 10 according to the first embodiment shown in FIGS. 2 to 7, an example in which the black level correction is performed on subject data of the left half region (image P2) of the image P1 input from the image sensor 100 in the first operation (the operation of the first path) and the black level correction is performed on subject data of the right half region (image P4) of the image P1 input from the image sensor 100 in the second operation (the operation of the second path) has been described. However, a region of an image on which the black level correction is performed in each of the first operation (the operation of the first path) and the second operation (the operation of the second path) is not limited to the orders shown in FIGS. 2 and 3. For example, the black level correction may be performed on the subject data of the right half region of the image P1 in the first operation (the operation of the first path) and the black level correction may be performed on the subject data of the left half region of the image P1 in the second operation (the operation of the second path).

In addition, the case in which the black level correction is performed on the subject data input from the image sensor 100 through two separate operations has been described in the example of the black level correction by the imaging device 10 according to the first embodiment shown in FIGS. 2 to 7. However, the number of operations into which the black level correction to be performed on subject data of one image is divided is not limited to two as described above, and may be 3 or more. Because the operation in which the number of operations into which the black level correction is divided is different can also be considered to be similar to an operation (an operation of the black level correction of the imaging device 10 according to the first embodiment shown in FIGS. 2 to 7) in which the black level correction is performed through two separate operations, a detailed description thereof will be omitted here.

The operation of pre-processing of the black level correction in the imaging device 10 according to the first embodiment need not necessarily be divided into two or more operations. For example, the pre-processing need not necessarily be divided into the two or more operations because the pre-processing unit 202 can perform the pre-processing of the black level correction at once when the number of pixels of the horizontal direction of the image sensor mounted on the imaging device is less than the storage capacity (6000 pixels in the first embodiment) of the line memory provided in the pre-processing unit 202 within the imaging processing unit 200, that is, when a data amount of input subject data is less than an amount of data capable of being pre-processed by the pre-processing unit 202. In this manner, it is possible to change the number of operations of pre-processing of the black level correction by the pre-processing unit 202 according to the number of pixels of the horizontal direction of the image sensor mounted on the imaging device.

In addition, in general, the image sensor can be driven in a plurality of driving modes such as a driving mode (hereinafter referred to as a "full-pixel output mode") in which all pixel signals are output and a driving mode (hereinafter referred to as a "pixel addition mode") in which pixel signals are added and output. Here, the full-pixel output mode is set when a high-resolution image such as a still image is captured. The pixel addition mode is set when a moving image is captured or photographing of a so-called live view function of causing a moving image for viewing a subject to be photographed to be displayed on a display device is performed. Thus, for example, when the image sensor 100 is driven in the pixel addition mode and pixel signals are added in the horizontal direction and therefore an image having 5000 pixels of a width of ½ is output, a data amount of image data of one row to be output by the image sensor 100 is less than a data amount (6000 pixels) of image data of one row capable of being held by the line memory provided in the pre-processing unit 202 within the imaging processing unit 200. Even in this case, the pre-processing need not necessarily be divided into two separate operations because the pre-processing unit 202 can perform the black level correction at once.

In this manner, based on a driving mode of the image sensor mounted on the imaging device, the number of times that the pre-processing unit 202 performs the pre-processing of the black level correction can be changed. For example, when the driving mode is a full pixel output mode, that is, a mode when a still image is captured, the pre-processing of the black level correction is performed through two separate operations. For example, when the driving mode is a pixel addition mode, that is, a mode when a moving image or a live view is captured, the pre-processing of the black level correction is performed at once in real time.

In the first embodiment, the case in which the image sensor 100 outputs a pixel signal subjected to raster scanning in the horizontal direction on an image as image data has been described. However, for example, when the image sensor outputs a pixel signal subjected to raster scanning in the vertical direction (longitudinal direction) on an image as image data, the concept of the present invention can be similarly applied by considering the horizontal direction in the first embodiment as the vertical direction. That is, considering the horizontal direction and the vertical direction of the image inversely. In addition, although the case in which pre-processing of the black level correction is performed through a plurality of separate operations by dividing the image input from the image sensor 100 in the horizontal direction has been described in the first embodiment, the concept of the present invention can be similarly applied by considering the horizontal direction and the vertical direction of the image inversely even when the pre-processing of the black level correction is performed through a plurality of separate operations by dividing the image input from the image sensor 100 in the vertical direction.

In addition, in the first embodiment, a configuration in which the data extracting unit 201 performs a process of extracting OB data from the image data input from the image sensor 100 and dividing the image region, and the pre-processing unit 202 performs the black level correction on the subject data of the divided image region based on the OB data input from the data extracting unit 201 has been described. However, the configuration in which OB data is extracted from the image data input from the image sensor 100 and the image region is divided is not limited to the configuration of the imaging device 10 according to the first embodiment. For example, the data extracting unit 201 may be a configuration in which the image data input from the image sensor 100 and the image data input from the data acquiring unit 205 are output to either or both of the pre-processing unit 202 and the second data transfer unit 204, that is, only an operation of selecting a component of an output destination of image data is performed. In this case, the pre-processing unit 202 is a configuration in which the pre-processing including the black level correction is performed after a process of extracting the OB data for performing black level correction and dividing the image region is performed, and the second data transfer unit 204 is a configuration in which original image data on which the black level correction is not capable of being performed is stored in the DRAM 601 after a process of extracting the OB data for performing black level correction and dividing the image region is performed.

In the imaging device, configuring the imaging processing unit 200, the image processing unit 300, the display processing unit 400, the card IT unit 500, the DRAM controller 600, and the CPU 700 connected to the data bus 800 as one signal processing device can also be considered. At this time, the number of pixels of the image sensor corresponding to each component provided in the one signal processing device is considered to correspond to a small number of pixels, rather than corresponding to a largest number of pixels. This is because an increase in the cost of the entire system is caused in the signal processing device corresponding to an unnecessary number of pixels, for example, when the signal processing device is adopted in the imaging device equipped with an image sensor having a small number of pixels. Then, when the signal processing device is adopted in the imaging device equipped with an image sensor having a large number of pixels, a countermeasure is considered by increasing the number of signal processing devices mounted on the imaging device according to the number of pixels of the image sensor. In this case, as in the imaging device 10 according to the first embodiment, the signal processing devices mounted on the imaging device can simultaneously perform pre-processing including black level correction on image data divisions without performing pre-processing including the black level correction on the image data input from the image sensor 100 through a plurality of separate operations. The concept of the present invention can also be similarly applied to the imaging device equipped with a plurality of signal processing devices as described above.

Second Embodiment

Next, the case in which the concept of the present invention is applied to the imaging device according to the second embodiment equipped with a plurality of signal processing devices will be described. In the following description, an imaging device of a configuration in which two pre-processing operations including black level correction for image data are simultaneously performed will be described.

Figure 8:
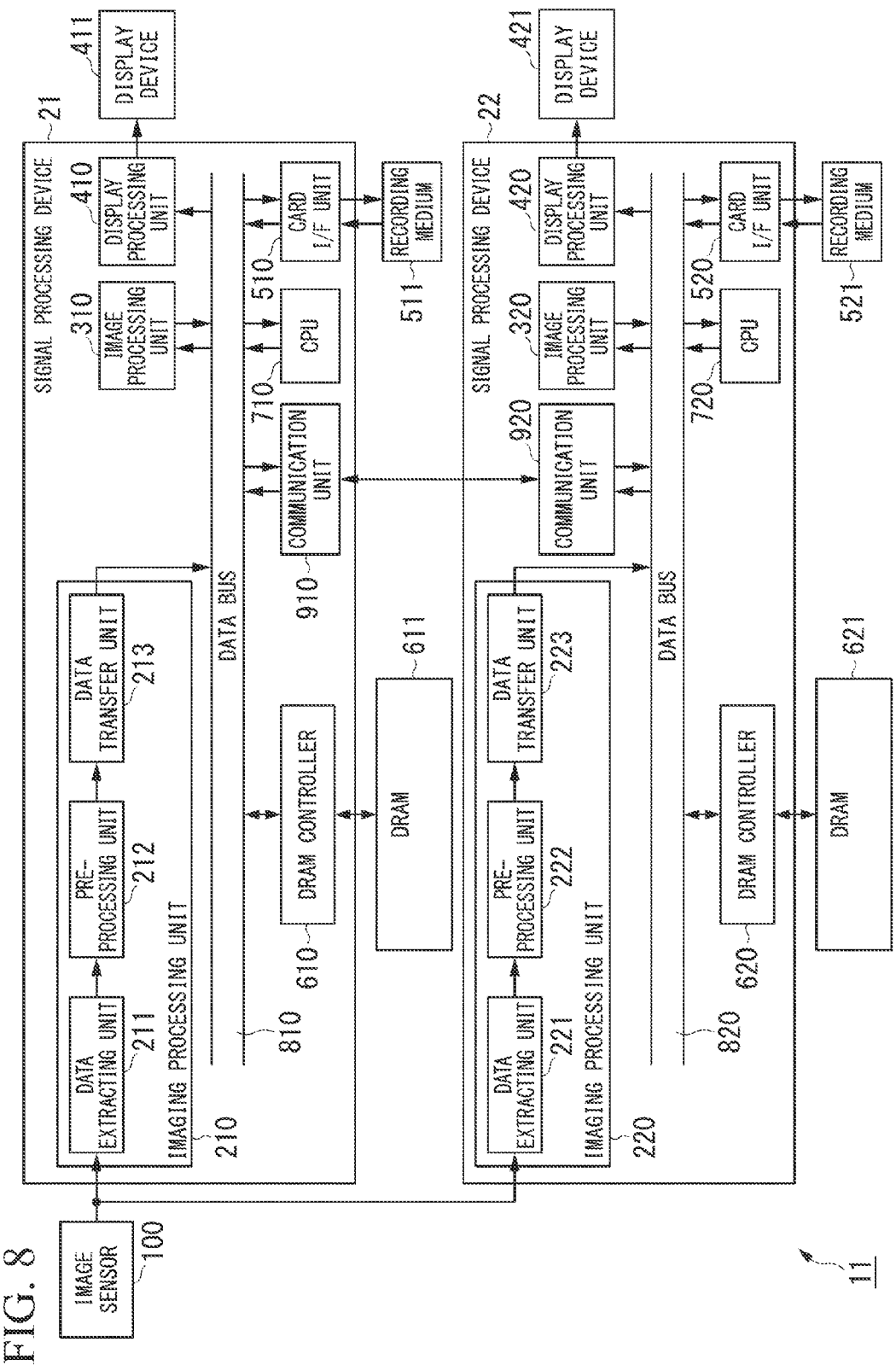
FIG. 8 is a block diagram showing a schematic configuration of the imaging device according to the second embodiment of the present invention.

FIG. 8 is a block diagram showing a schematic configuration of the imaging device according to the second embodiment. The imaging device 11 shown in FIG. 8 includes an image sensor 100, two signal processing devices (21 and 22), two display devices (411 and 421), two recording media (511 and 521), and two DRAMs (611 and 621).

The image sensor 100, the display devices 411 and 421, the recording media 511 and 521, and the DRAMs 611 and 621 are similar to the image sensor 100, the display device 401, the recording medium 501, and the DRAM 601 provided in the imaging device 10 according to the first embodiment, respectively. Accordingly, a detailed description related to each of the image sensor 100, the display devices 411 and 421, the recording media 511 and 521, and the DRAMs 611 and 621 will be omitted here. In the imaging device 11 according to the second embodiment, the image sensor 100 outputs the same image data to both the signal processing devices 21 and 22.

Each of the signal processing devices 21 and 22 performs processing on image data similar to that of the imaging device 10 according to the first embodiment by sharing the processing. The signal processing device 21 includes an imaging processing unit 210, an imaging processing unit 310, a display processing unit 410, a card I/F unit 510, a DRAM controller 610, a CPU 710, and a communication unit 910. Each of the imaging processing unit 210, the imaging processing unit 310, the display processing unit 410, the card I/F unit 510, the DRAM controller 610, the CPU 710, and the communication unit 910 is connected via the data bus 800, and, for example, reads data from the DRAM 611 connected to the DRAM controller 610 through DMA and writes data to the DRAM 611.

The imaging processing unit 310, the display processing unit 410, the card I/F unit 510, the DRAM controller 610, the CPU 710, and the data bus 810 provided in the signal processing device 21 are similar to the imaging processing unit 300, the display processing unit 400, the card I/F unit 500, the DRAM controller 600, the CPU 700, and the data bus 800 provided in the imaging device 10 according to the first embodiment, respectively. Accordingly, detailed description of each of the imaging processing unit 310, the display processing unit 410, the card I/F unit 510, the DRAM controller 610, the CPU 710, and the data bus 810 will be omitted here.

Like the imaging processing unit 200 provided in the imaging device 10 according to the first embodiment, the imaging processing unit 210 fetches image data input from the image sensor 100 to divide the fetched image data into OB data and subject data. Further, the imaging processing unit 200 transfers (writes) the resulting pre-processed image data obtained by performing pre-processing including the black level correction based on the OB data for the subject data to the DRAM 611 via the DRAM controller 610. The imaging processing unit 210 includes a data extracting unit 211, a pre-processing unit 212, and a data transfer unit 213.

Like the data extracting unit 201 within the imaging processing unit 200 provided in the imaging device 10 according to the first embodiment, the data extracting unit 211 divides input image data into OB data and subject data. More specifically, the data extracting unit 211 divides the input image data into the OB data and the subject data by extracting the OB data from the image data input from the image sensor 100. Then, the data extracting unit 211 outputs each of the subject data and the corresponding OB data into which the image data has been divided to the pre-processing unit 212.

The pre-processing unit 212 and the data transfer unit 213 provided in the imaging processing unit 210 are similar to the pre-processing unit 202 and the first data transfer unit 203 within the imaging processing unit 200 provided in the imaging device 10 according to the first embodiment, respectively. Accordingly, a detailed description related to each of the pre-processing unit 212 and the data transfer unit 213 will be omitted here.

The communication unit 910 communicates with the communication unit 920 provided in the signal processing device 22, and transmits and receives image data between the signal processing device 21 and the signal processing device 22. More specifically, when image data stored in the DRAM 621 connected to the DRAM controller 620 provided in the signal processing device 22 is acquired, the communication unit 910 requests the communication unit 920 provided in the signal processing device 22 to transmit the image data stored in the DRAM 621 and receives image data transmitted via the communication unit 920. Next, the communication unit 910 transfers (writes) the received image data to the DRAM 611 via the DRAM controller 610. In addition, when there is a transmission request for image data stored in the DRAM 611 from the communication unit 920 provided in the signal processing device 22, the communication unit 910 acquires image data stored in the DRAM 611 via the DRAM controller 610 and transmits the acquired image data to the communication unit 920.

The signal processing device 22 includes an imaging processing unit 220, an image processing unit 320, a display processing unit 420, a card I/F unit 520, a DRAM controller 620, a CPU 720, and a communication unit 920. The imaging processing unit 220, the image processing unit 320, the display processing unit 420, the card I/F unit 520, the DRAM controller 620, the CPU 720, and the communication unit 920 are connected via the data bus 820. For example, the reading of data from the DRAM 621 connected to the DRAM controller 620 through DMA and the writing of data to the DRAM 621 are performed. The imaging processing unit 220 includes a data extracting unit 221, a pre-processing unit 222, and a data transfer unit 223.

Because the signal processing device 22 processes image data by sharing processing with the signal processing device 21 as described above, components and operations thereof are similar to those of the signal processing device 21. That is, the imaging processing unit 220, the image processing unit 320, the display processing unit 420, the card I/F unit 520, the DRAM controller 620, the CPU 720, the communication unit 920, and the data bus 820 within the signal processing device 22 operate like the imaging processing unit 210, the image processing unit 310, the display processing unit 410, the card I/F unit 510, the DRAM controller 610, the CPU 710, the communication unit 910, and the data bus 810 within the signal processing device 21, respectively. In addition, the data extracting unit 221, the pre-processing unit 222, and the data transfer unit 223 within the imaging processing unit 220 provided in the signal processing device 22 operate like the data extracting unit 211, the pre-processing unit 212, and the data transfer unit 213 within the imaging processing unit 210 provided in the signal processing device 21, respectively. Accordingly, a detailed description related to components provided in the signal processing device 22 will be omitted here.

Through this configuration, the imaging device 11 according to the second embodiment divides subject data included in fetched image data into two while fetching the image data output from the image sensor 100 in real time. Next, the signal processing devices 21 and 22 perform various pre-processing including the black level correction based on OB data directly for subject data divisions by sharing the pre-processing.

Next, an example of an operation in which the imaging device 11 performs pre-processing (black level correction based on OB data) on subject data included in image data output from the image sensor 100 will be described. In the following description, the case in which the number of pixels of the horizontal direction of the image sensor 100 is 10000 and each of the pre-processing units 212 and 222 includes a line memory of a storage capacity of 6000 pixels in the horizontal direction as in the operation in the imaging device 10 according to the first embodiment will be described here. That is, an operation of a method of performing pre-processing of the black level correction on the subject data of one row in the case of a configuration in which a data amount of image data of the horizontal direction output by the image sensor 100 for every row is greater than a data amount of image data of one row capable of being held by the line memory provided in the pre-processing unit 212 or 222 and it is difficult to hold all subject data of one row in the line memory will be described. In the following description, the amount of OB data is not considered for ease of description as in the imaging device 10 according to the first embodiment.

When a data amount of the input subject data is greater than an amount of data which can be handled by the line memories provided in the pre-processing units 212 and 222, that is, when a data amount of the subject data capable of being pre-processed by either the imaging processing unit 210 or 220 is less than a data amount of the subject data output by the image sensor 100 as a data amount of one row, each of the pre-processing units 212 and 222 pre-processes the subject data by sharing the pre-processing in the imaging device 10. More specifically, the imaging device 11 divides an image region within the pixel unit of the image sensor 100 in the range of an amount (here, 6000 pixels) of data of capable of being pre-processed by the pre-processing units 212 and 222, and each of the pre-processing units 212 and 222 corresponding to the subject data of the image region divisions simultaneously pre-processes the input subject data. In the following description, for ease of description, the case in which subject data input from the image sensor 100 is divided into two and the two subject data divisions are simultaneously pre-processed will be described here.

Figure 9B:
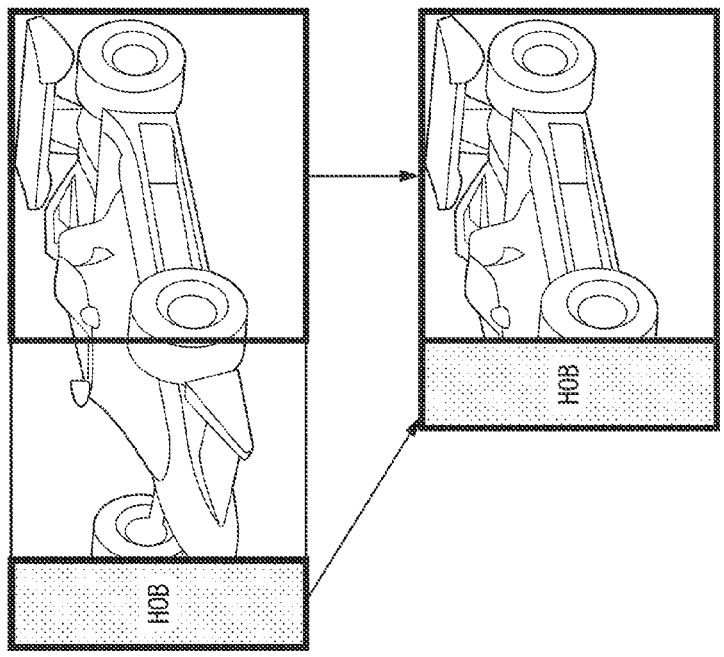
FIG. 9B is a diagram showing a concept in which the black level correction of the horizontal direction is performed by the imaging device according to the second embodiment.
Figure 9A:
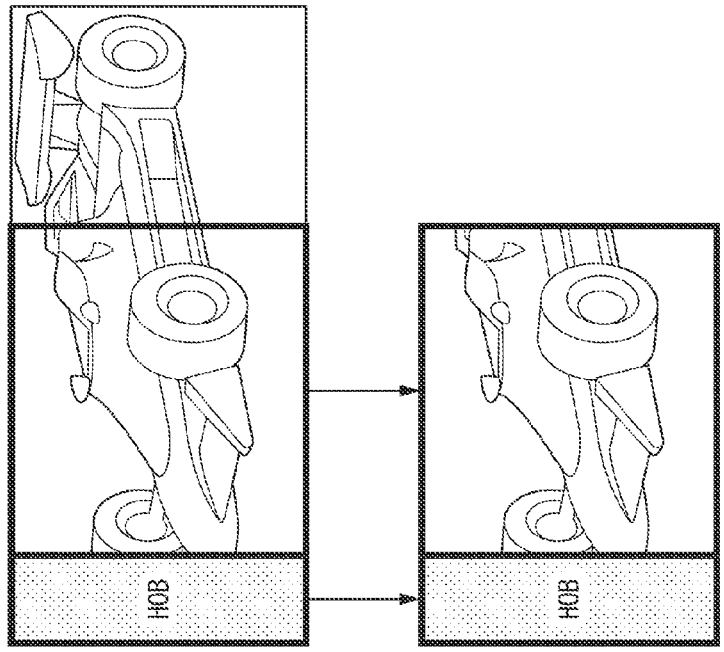
FIG. 9A is a diagram showing a concept in which the black level correction of the horizontal direction by the imaging device is performed according to the second embodiment.
Figure 10A:
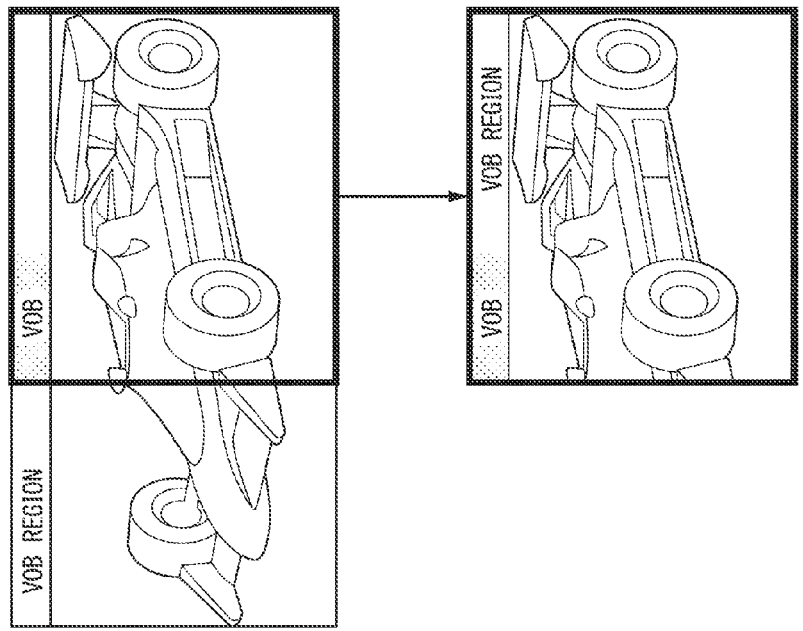
FIG. 10A is a diagram showing a concept in which the black level correction of the vertical direction is performed by the imaging device according to the second embodiment.
Figure 10B:
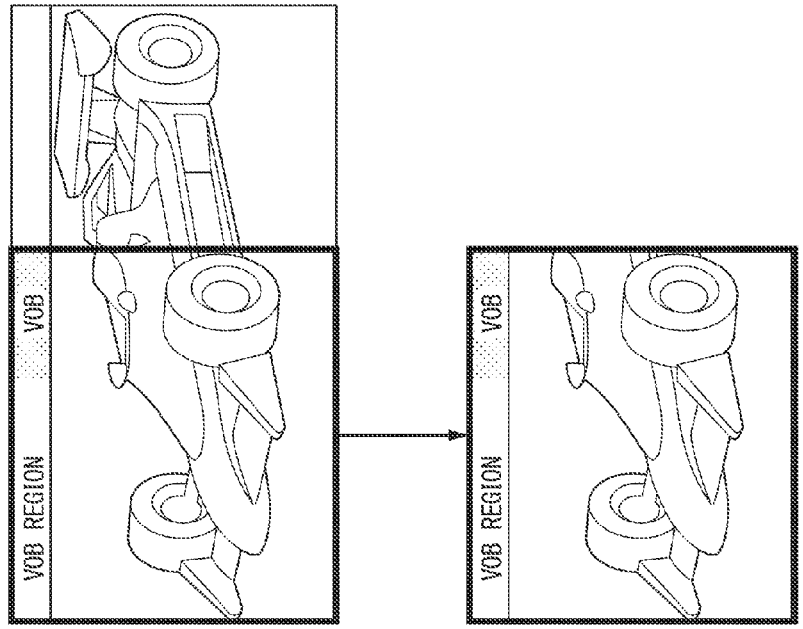
FIG. 10B is a diagram showing a concept in which the black level correction of the vertical direction is performed by the imaging device according to the second embodiment.

The concept in which each of the black level correction of the horizontal direction and the black level correction of the vertical direction is simultaneously performed on two subject data divisions in the imaging device 11 according to the second embodiment will be described. Each of FIGS. 9A and 9B is a diagram showing a concept in which the black level correction of the horizontal direction is performed by the imaging device 11 according to the second embodiment. In addition, each of FIGS. 10A and 10B is a diagram showing a concept in which the black level correction of the vertical direction is performed by the imaging device 11 according to the second embodiment.

First, a concept in which the imaging device 11 simultaneously performs the black level correction of the horizontal direction will be described using FIGS. 9A and 9B. Each of FIGS. 9A and 9B is an example in which the HOB region is located on a left end of the image region in the pixel unit of the image sensor 100.

In the black level correction of the horizontal direction in the imaging device 11, only an image region within the pixel unit of the image sensor 100 is divided as in the black level correction of the horizontal direction in the imaging device 10 according to the first embodiment. Then, the imaging processing units 210 and 220 simultaneously perform the black level correction of the horizontal direction on the subject data of image region divisions based on the HOB data of the same HOB region. That is, the imaging processing units 210 and 220 perform the black level correction of the horizontal direction on the subject data of the corresponding image region using common HOB data between image region divisions.

More specifically, in the operation of the imaging processing unit 210 of the black level correction of the horizontal direction in the imaging device 11, as shown in FIG. 9A, the data extracting unit 211 extracts HOB data of an HOB region, and outputs the extracted HOB data and subject data of one (left) half obtained by dividing the image region to the pre-processing unit 212. Then, the pre-processing unit 212 performs the black level correction of the horizontal direction on the divided subject data of the one (left) half based on the HOB data input from the data extracting unit 211. In addition, in the operation of the imaging processing unit 220 of the black level correction of the horizontal direction in the imaging device 11, as shown in FIG. 9B, the data extracting unit 221 extracts HOB data of an HOB region, and outputs the extracted HOB data and subject data the other (right) half obtained by dividing the image region to the pre-processing unit 222. Then, the pre-processing unit 222 performs the black level correction of the horizontal direction on the divided subject data of the other (right) half based on the HOB data input from the data extracting unit 211.

In this manner, in the black level correction of the horizontal direction in the imaging device 11, each of the imaging processing units 210 and 220 performs the black level correction of the horizontal direction on the subject data of the entire region of one image by simultaneously executing the black level correction of the horizontal direction on the subject data of the image region divisions using the HOB data of the same HOB region.

Next, a concept in which the imaging device 11 simultaneously performs the black level correction of the vertical direction will be described using FIGS. 10A and 10B. Each of FIGS. 10A and 10B is an example in which the VOB region is located on an upper end of the image region in the pixel unit of the image sensor 100.

In the black level correction of the vertical direction by the imaging device 11, as in the black level correction of the vertical direction in the imaging device 10 according to the first embodiment, the VOB data within the VOB region corresponding to the overlap region is used. Then, the imaging processing units 210 and 220 simultaneously perform the black correction of the vertical direction on the subject data of image region divisions based on the VOB data within the VOB region corresponding to the same overlap region. That is, the imaging processing units 210 and 220 perform the black level correction of the vertical direction on the subject data of the corresponding image region using VOB data within a common overlap region between image region divisions.

More specifically, in the operation of the imaging processing unit 210 of the black level correction of the vertical direction in the imaging device 11, as shown in FIG. 10A, the VOB data of the VOB region located within the overlap region within the VOB region located on the entire upper side of the image region is extracted, and the extracted VOB data and subject data of one (left) half obtained by dividing the image region are output to the pre-processing unit 212. Then, the pre-processing unit 212 performs the black level correction of the vertical direction on the subject data of the division of the one (left) half based on the VOB data input from the data extracting unit 211. In the operation of the imaging processing unit 210 of the black level correction of the vertical direction in the imaging device 11, as shown in FIG. 10B, the VOB data of the VOB region located within the overlap region within the VOB region located on the entire upper side of the image region is extracted, and the extracted VOB data and subject data of the other (right) half obtained by dividing the image region is output to the pre-processing unit 222. Then, the pre-processing unit 222 performs the black level correction of the vertical direction on the subject data of the division of the other (right) half based on the VOB data input from the data extracting unit 221.

In this manner, in the black level correction of the vertical direction in the imaging device 11, each of the imaging processing units 210 and 220 performs the black level correction of the vertical direction on the subject data of the entire region of one image by simultaneously executing the black level correction of the vertical direction on the subject data of the image region divisions using the VOB data of the VOB region located within the same overlap region.

Even for the black level correction of the horizontal direction in the above-described imaging device 11, although not described, the overlap region may be provided on each boundary part along which the image region is divided even when the black level correction of the horizontal direction in the imaging device 11 is performed as in the black level correction of the horizontal direction in the imaging device 10 according to the first embodiment. In this manner, it is possible to eliminate disharmony of an image in the boundary part along which processing is divided by providing the overlap region at the time of the pre-processing to be performed by dividing the image region into a plurality of divisions as well as the black level correction.

Figure 11:
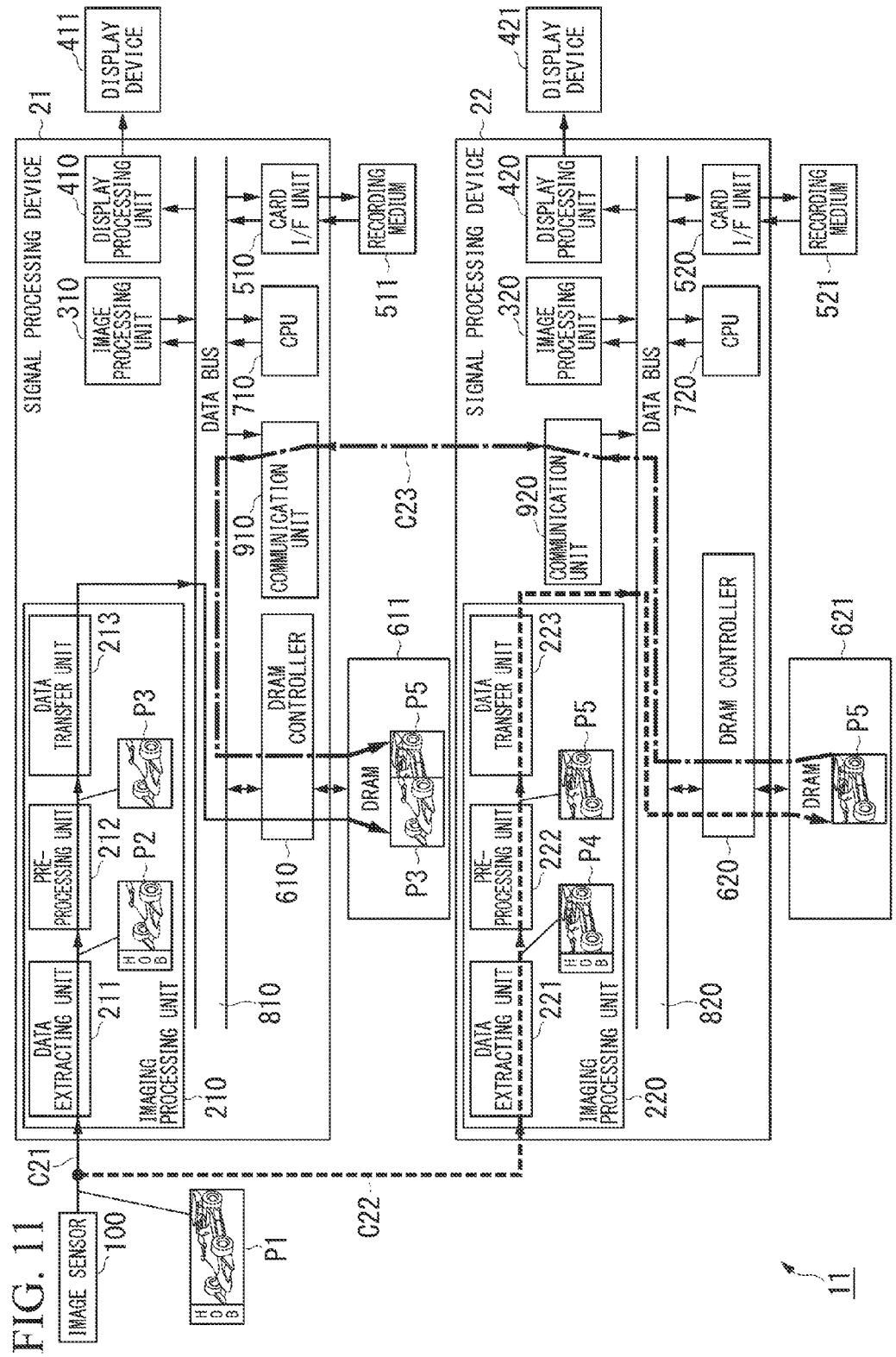
FIG. 11 is a diagram schematically showing an example of an operation in which the black level correction of the horizontal direction is performed by the imaging device according to the second embodiment.

Next, an example of an actual operation of each of the black level correction of the horizontal direction and the black level correction of the vertical direction in the imaging device 11 according to the second embodiment will be described. First, an example of an operation in which the imaging processing units 210 and 220 simultaneously perform the black level correction of the horizontal direction in the imaging device 11 will be described. FIG. 11 is a diagram schematically showing an example of an operation in the black level correction of the horizontal direction by the imaging device 11 according to the second embodiment.

In the operation of the black level correction of the horizontal direction by the imaging device 11, pre-processed image data obtained after each of the signal processing devices 21 and 22 simultaneously performs the black level correction of the horizontal direction in real time on the subject data output from the image sensor 100 based on HOB data of an HOB region located on the left end of the pixel unit of the image sensor 100 is transferred (written) to each of the DRAMs 611 and 621. Then, after the black level correction of the horizontal direction by each of the signal processing devices 21 and 22 is completed, the signal processing device 21 acquires pre-processed image data obtained after the signal processing device 22 performs the black level correction and transfers (writes) the acquired pre-processed image data to the DRAM 611. In FIG. 11, each data path in the operation of the black level correction of the horizontal direction is shown on the block diagram of the imaging device 11 shown in FIG. 8.

In the path of the image data of a path C21 shown in FIG. 11, the signal processing device 21 performs pre-processing (black level correction of the horizontal direction based on the HOB data) in real time on subject data of one (left) half input from the image sensor 100, and transfers (writes) the resulting pre-processed image data obtained by performing the black level correction of the horizontal direction to the DRAM 611. More specifically, the image sensor 100 captures one image P1 having a horizontal width of 10000 pixels and outputs the subject data of the captured image P1 to the signal processing devices 21 and 22 along with the HOB data. In the signal processing device 21, the imaging processing unit 210 fetches the HOB data input from the image sensor 100 and the subject data of the entire region of the image P1, and the fetched HOB data and the fetched subject data of the image P1 are sequentially input to the data extracting unit 211 within the imaging processing unit 210. The data extracting unit 211 extracts the HOB data input along with the subject data of the image P1 and divides an image region of the image P1 into two. Then, the data extracting unit 211 sequentially outputs the extracted HOB data and the subject data of the image P2 which is a left half region of the image P1 to the pre-processing unit 212.

Based on the HOB data input from the data extracting unit 211, the pre-processing unit 212 performs the black level correction of the horizontal direction on the subject data of the image P2 sequentially input from the data extracting unit 211, and sequentially outputs the pre-processed image data of the image P3 after the black level correction of the horizontal direction is performed to the data transfer unit 213. Then, the data transfer unit 213 transfers (writes) the pre-processed image data of the image P3 sequentially input from the pre-processing unit 212 to the DRAM 611 via the DRAM controller 610. Thereby, the pre-processed image data of the image P3 after the black level correction of the horizontal direction is performed is stored in the DRAM 611.

Simultaneously, in the path of the image data of a path C22 shown in FIG. 11, the signal processing device 22 performs pre-processing (black level correction of the horizontal direction based on the HOB data) in real time on subject data the other (right) half input from the image sensor 100, and transfers (writes) the resulting pre-processed image data obtained by performing the black level correction of the horizontal direction to the DRAM 621. More specifically, in the signal processing device 22, the imaging processing unit 220 fetches the HOB data input from the image sensor 100 and the subject data of the entire region of the image P1. The fetched HOB data and the fetched subject data of the image P1 are sequentially input to the data extracting unit 211 within the imaging processing unit 220. The data extracting unit 221 extracts the HOB data input along with the subject data of the image P1 and divides the image region of the image P1 into two. Then, the data extracting unit 221 sequentially outputs the extracted HOB data and the subject data of the image P4 which is a right half of the image P1, to the pre-processing unit 222.

Based on the HOB data input from the data extracting unit 211, the pre-processing unit 222 performs the black level correction of the horizontal direction on the subject data of the image P4 sequentially input from the data extracting unit 221, and sequentially outputs the pre-processed image data of the image P5 after the black level correction is performed to the data transfer unit 223. Then, the data transfer unit 223 transfers (writes) the pre-processed image data of the image P5 sequentially input from the pre-processing unit 222 to the DRAM 621 via the DRAM controller 620. Thereby, the pre-processed image data of the image P5 after the black level correction of the horizontal direction is performed is stored in the DRAM 621.

In this manner, the signal processing device 21 stores pre-processed image data of the image P3 obtained by performing the black level correction of the horizontal direction on a left half of the image P1 output by the image sensor 100 in the DRAM 611 at the same timing when the signal processing device 22 stores pre-processed image data of the image P5 obtained by performing the black level correction of the horizontal direction on a right half of the image P1 output by the image sensor 100 in the DRAM 621.

Thereafter, in a path of image data of a path C23 shown in FIG. 11, the signal processing device 21 acquires the pre-processed image data of the image P5 stored in the DRAM 621, and transfers (writes) the acquired pre-processed image data of the image P5 to the DRAM 611. More specifically, the communication unit 910 requests the communication unit 920 provided in the signal processing device 22 to transmit the pre-processed image data of the image P5 stored in the DRAM 621. The communication unit 920 sequentially acquires (reads) the pre-processed image data of the image P5 stored in the DRAM 621 via the DRAM controller 620 according to the transmission request for the pre-processed image data of the image P5 from the communication unit 910, and sequentially transmits the acquired pre-processed image data of the image P5 to the communication unit 910. Then, the communication unit 910 sequentially receives the pre-processed image data of the image P5 transmitted from the communication unit 920. The communication unit 910 transfers (writes) the received pre-processed image data of the image P5 to the DRAM 611 via the DRAM controller 610. Thereby, the pre-processed image data of the image P5 is stored in the DRAM 611 after the black level correction of the horizontal direction is performed.

In this manner, the signal processing device 21 stores the pre-processed image data of the image P5 corresponding to the image P4 of the right half of the image P1 output by the image sensor 100 stored in the DRAM 621 after the signal processing device 22 performs the black level correction of the horizontal direction in the DRAM 611. Thereby, the pre-processed image data (the pre-processed image data of a combination of the image P3 and the image P5) obtained by performing the black level correction of the horizontal direction on the subject data of the entire region of one image P1 having a horizontal width of 10000 pixels captured by the image sensor 100 is stored in the DRAM 611.

In this manner, in the black level correction of the horizontal direction by the imaging device 11 according to the second embodiment, it is possible to divide only an image region within the pixel unit of the image sensor 100 and perform the black level correction on subject data of regions of all images captured by the image sensor 100 based on the HOB data of the same HOB region, that is, common HOB data.

More specifically, first, the signal processing devices 21 and 22 simultaneously transfer (write) pre-processed image data obtained by performing the black level correction of the horizontal direction in real time on the subject data of the left half and the subject data of the right half of the image P1 input from the image sensor 100 to the DRAMs 611 and 621, respectively. That is, the signal processing device 21 transfers (writes) pre-processed image data obtained by performing the black level correction of the horizontal direction in real time on the subject data of the left half of the image P1 input from the image sensor 100 to the DRAM 611. The signal processing device 22 transfers (writes) pre-processed image data obtained by performing the black level correction of the horizontal direction in real time on the subject data of the right half of the image P1 input from the image sensor 100 to the DRAM 621. The above-mentioned processing by the signal processing device 21 and the processing by the signal processing device 22 are performed simultaneously. Thereafter, the signal processing device 21 stores the pre-processed image data obtained by performing the black level correction of the horizontal direction on all the subject data of one image P1 in the DRAM 611 by acquiring the pre-processed image data after the signal processing device 22 performs the black level correction of the horizontal direction on the subject data of the right half of the image P1 input from the image sensor 100.

Figure 12:
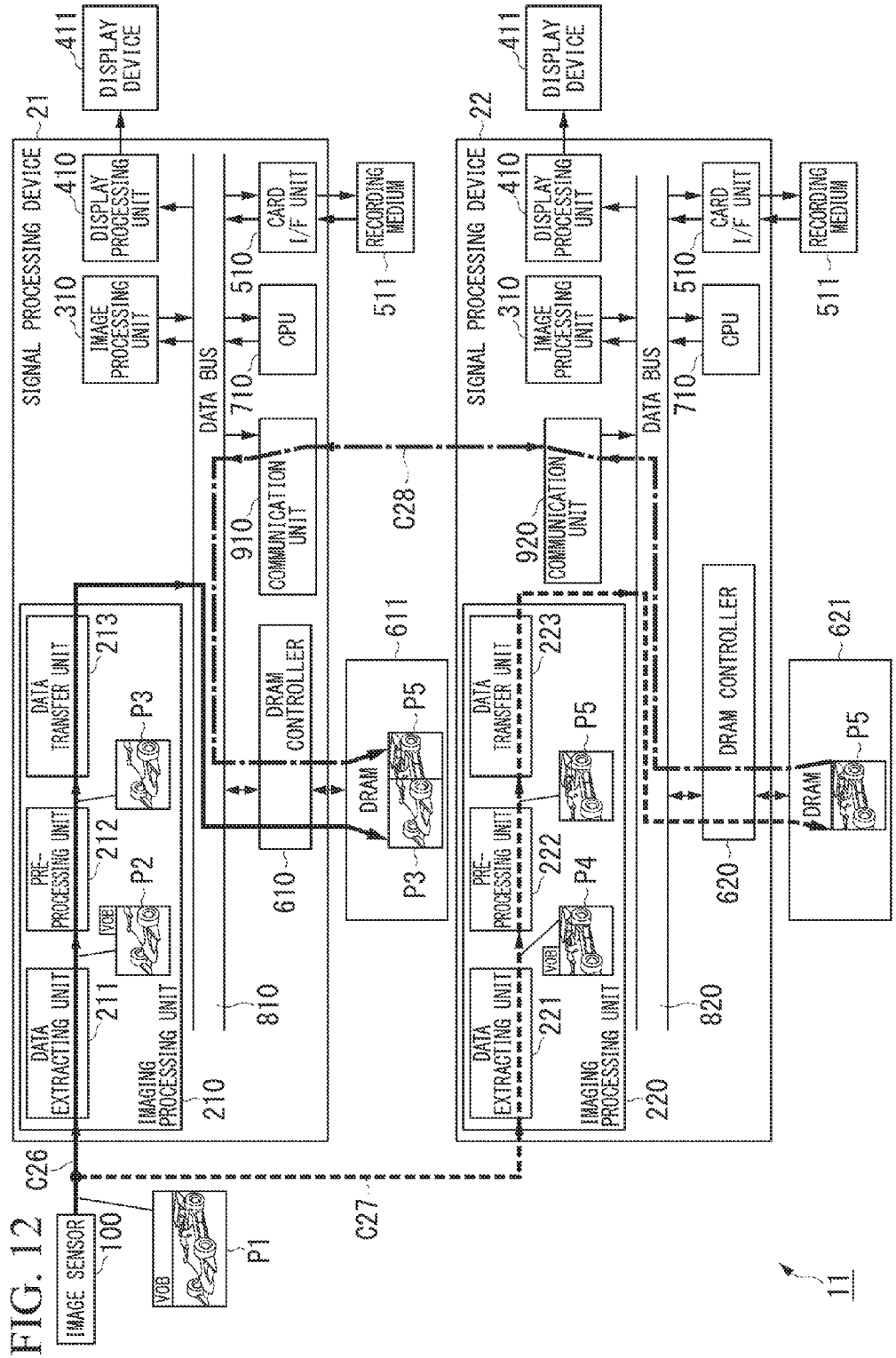
FIG. 12 is a diagram schematically showing an example of an operation in which the black level correction of the vertical direction is performed by the imaging device according to the second embodiment of the present invention.

Next, an example of an operation in which the imaging processing units 210 and 220 simultaneously perform the black level correction of the vertical direction in the imaging device 11 will be described. FIG. 12 is a diagram schematically showing an example of an operation in the black level correction of the vertical direction by the imaging device 11 according to the second embodiment.

In the black level correction of the vertical direction by the imaging device 11, pre-processed image data obtained by performing the black level correction of the vertical direction in real time on the subject data output from the image sensor 100 based on VOB data of a VOB region located within an overlap region within a VOB region located on the upper end of the pixel unit of the image sensor 100 is transferred (written) to each of the DRAMs 611 and 621. Then, after the black level correction of the vertical direction by each of the signal processing devices 21 and 22 is completed, the signal processing device 21 acquires pre-processed image data obtained after the signal processing device 22 performs the black level correction and transfer (write) the acquired pre-processed image data to the DRAM 611. In FIG. 12, each data path in the black level correction of the vertical direction is shown on the block diagram of the imaging device 11 shown in FIG. 8.

In the path of the image data of a path C26 shown in FIG. 12, the signal processing device 21 performs pre-processing (black level correction of the vertical direction based on the VOB data) in real time on subject data of one (left) half input from the image sensor 100, and transfers (writes) the resulting pre-processed image data obtained by performing the black level correction of the vertical direction to the DRAM 601. More specifically, the image sensor 100 captures one image P1 having a horizontal width of 10000 pixels and outputs the subject data of the captured image P1 to the signal processing devices 21 and 22 along with the VOB data. In the signal processing device 21, the imaging processing unit 210 fetches the VOB data input from the image sensor 100 and the subject data of the entire region of the image P1, and the fetched VOB data and the fetched subject data of the image P1 are sequentially input to the data extracting unit 211 within the imaging processing unit 210. The data extracting unit 211 extracts the VOB data of the VOB region within the overlap region from among the VOB data input along with the subject data of the image P1, and divides an image region of the image P1 into two. Then, the data extracting unit 211 sequentially outputs the extracted VOB data and the subject data of the image P2 which is a left half of the image P1 to the pre-processing unit 212.

Based on the VOB data input from the data extracting unit 211, the pre-processing unit 212 performs the black level correction of the vertical direction on the subject data of the image P2 sequentially input from the data extracting unit 211. The pre-processing unit 212 sequentially outputs the pre-processed image data of the image P3 after the black level correction of the vertical direction is performed to the data transfer unit 213. Then, the data transfer unit 213 transfers (writes) the pre-processed image data of the image P3 sequentially input from the pre-processing unit 212 to the DRAM 611 via the DRAM controller 610. Thereby, the pre-processed image data of the image P3 after the black level correction of the vertical direction is performed is stored in the DRAM 611.

Simultaneously, in the path of the image data of a path C27 shown in FIG. 12, the signal processing device 22 performs pre-processing (black level correction of the vertical direction based on the VOB data) in real time on subject data of the other (right) half input from the image sensor 100. The signal processing device 22 transfers (writes) the resulting pre-processed image data obtained by performing the black level correction of the vertical direction to the DRAM 621. More specifically, in the signal processing device 22, the imaging processing unit 220 fetches the VOB data input from the image sensor 100 and the subject data of the entire region of the image P1, and the fetched VOB data and the fetched subject data of the image P1 are sequentially input to the data extracting unit 221 within the imaging processing unit 220. The data extracting unit 221 extracts the VOB data of the VOB region within the overlap region from among the VOB data input along with the subject data of the image P1, and divides the image region of the image P1 into two. Then, the data extracting unit 221 sequentially outputs the extracted VOB data and the subject data of the image P4 which is a right half region of the image P1 to the pre-processing unit 222.

Based on the VOB data input from the data extracting unit 221, the pre-processing unit 222 performs the black level correction of the vertical direction on the subject data of the image P4 sequentially input from the data extracting unit 221. The pre-processing unit 222 sequentially outputs the pre-processed image data of the image P5 after the black level correction is performed to the data transfer unit 223. Then, the data transfer unit 223 transfers (writes) the pre-processed image data of the image P5 sequentially input from the pre-processing unit 222 to the DRAM 621 via the DRAM controller 620. Thereby, the pre-processed image data of the image P5 after the black level correction of the vertical direction is performed is stored in the DRAM 621.

In this manner, as in the operation of the black level correction of the horizontal direction by the imaging device 11, the signal processing devices 21 stores pre-processed image data of the image P3 obtained by performing the black level correction of the vertical direction on a left half of the image P1 output by the image sensor 100 in the DRAM 611 at the same timing when the signal processing device 22 stores the pre-processed image data of the image P5 obtained by performing the black level correction of the vertical direction on a right half of the image P1 output by the image sensor 100 in the DRAM 621.

Thereafter, as in the operation of the black level correction of the horizontal direction by the imaging device 11, in a path of image data of a path C28 shown in FIG. 12, the signal processing device 21 acquires the pre-processed image data of the image P5 stored in the DRAM 621. The signal processing device 21 transfers (writes) the acquired pre-processed image data of the image P5 to the DRAM 611. More specifically, the communication unit 910 request the communication unit 920 provided in the signal processing device 22 to transmit the pre-processed image data of the image P5 stored in the DRAM 621. The communication unit 920 sequentially acquires (reads) the pre-processed image data of the image P5 stored in the DRAM 621 via the DRAM controller 620 according to the transmission request for the pre-processed image data of the image P5 from the communication unit 910, and sequentially transmits the acquired pre-processed image data of the image P5 to the communication unit 910. Then, the communication unit 910 sequentially receives the pre-processed image data of the image P5 transmitted from the communication unit 920, and transfers (writes) the received pre-processed image data of the image P5 to the DRAM 611 via the DRAM controller 610. Thereby, the pre-processed image data of the image P5 after the black level correction of the vertical direction is performed is stored in the DRAM 611.

In this manner, the signal processing device 21 stores the pre-processed image data of the image P5 corresponding to the image P4 of the right half of the image P1 output by the image sensor 100 stored in the DRAM 621 after the signal processing device 22 performs the black level correction of the vertical direction in the DRAM 611. Thereby, the pre-processed image data (the pre-processed image data of a combination of the image P3 and the image P5) obtained by performing the black level correction of the vertical direction on the subject data of the entire region of one image P1 having a horizontal width of 10000 pixels captured by the image sensor 100 is stored in the DRAM 611.

In this manner, in the black level correction of the vertical direction by the imaging device 11 according to the second embodiment, it is possible to divide only an image region within the pixel unit of the image sensor 100 and perform the black level correction on subject data of regions of all images captured by the image sensor 100 based on the VOB data of the same VOB region located within the overlap region, that is, common VOB data.

More specifically, first, the signal processing devices 21 and 22 simultaneously transfer (write) pre-processed image data obtained by performing the black level correction of the vertical direction in real time on the subject data of the left half and the subject data of the right half of the image P1 input from the image sensor 100 to the DRAMs 611 and 621, respectively. Thereafter, the signal processing device 21 stores the pre-processed image data obtained by performing the black level correction of the vertical direction on all the subject data of one image P1 in the DRAM 611 by acquiring the pre-processed image data obtained after the signal processing device 22 performs the black level correction of the vertical direction on the subject data of the right half of the image P1 input from the image sensor 100.

As described above, in the imaging device 11 according to the second embodiment, the black level correction is simultaneously performed on all the input subject data when a data amount of subject data of the horizontal direction output by the image sensor 100 is greater than a data amount of the subject data capable of being held by the line memory provided in each of the pre-processing unit 212 within the imaging processing unit 210 provided in the signal processing device 21 and the pre-processing unit 222 within the imaging processing unit 220 provided in the signal processing device 22. At this time, in the black level corrections of the horizontal direction and the vertical direction by the imaging device 11 according to the second embodiment, only the image region within the pixel unit of the image sensor 100 is divided, and each of the signal processing devices 21 and 22 simultaneously performs the black level correction on the subject data of image region divisions based on the OB data (common OB data) of the same OB region. That is, the imaging device 11 executes the black level corrections of the horizontal and vertical directions according to the image sensor 100 having an increased number of pixels by increasing the number of signal processing devices according to the number of pixels of the image sensor 100. Thereby, in the imaging device 11 according to the second embodiment, it is possible to perform good black level correction without disharmony in a boundary part along which the black level correction is divided as in the imaging device 10 according to the first embodiment even when a plurality of corresponding signal processing devices simultaneously perform the black level correction by dividing an image output by the image sensor 100 into a plurality of divisions.

In an example of an operation of the black level correction by the imaging device 11 according to the second embodiment shown in FIGS. 9A to 12, an example in which the signal processing device 21 performs the black level correction on subject data of the left half region (image P2) of the image P1 input from the image sensor 100 and the signal processing device 22 performs the black level correction on subject data of the right half region (image P4) of the image P1 input from the image sensor 100 has been described. However, a region of an image on which each of the signal processing devices 21 and 22 performs the black level correction is not limited to the regions shown in FIGS. 9A, 9B, 10A, and 10B. For example, the signal processing device 21 may perform the black level correction on the subject data of the right half region of the image P1, and the signal processing device 22 may perform the black level correction on the subject data of the left half region of the image P1.

In addition, the case in which the subject data input from the image sensor 100 is divided into two and each of the signal processing devices 21 and 22 corresponding to subject data divisions simultaneously performs the black level correction directly by sharing the black level correction has been described in an example of the operation of the black level correction by the imaging device 11 according to the second embodiment shown in FIGS. 9A to 12. However, the number of divisions for executing the black level correction on the subject data of one image is not limited to two as described above, and may be 3 or more. However, in this case, a number of signal processing devices according to the number of divisions should be provided in the imaging device. Because an operation in which the number of divisions for executing the black level correction is different can be considered to be similar to the operation (the operation of the black level correction of the imaging device 11 according to the second embodiment shown in FIGS. 9A to 12) in which the black level correction is performed through two separate operations, a detailed description will be omitted here.

The signal processing devices 21 and 22 need not necessarily share the operation of pre-processing of the black level correction in the imaging device 11 according to the second embodiment. For example, when the number of pixels of the horizontal direction of the image sensor mounted on the imaging device is less than the storage capacity (6000 pixels in the second embodiment) of the line memory provided in the pre-processing unit 212 within the imaging processing unit 210 provided in the signal processing device 21, that is, when a data amount of the input subject data is less than an amount of data on which the pre-processing unit 212 performs pre-processing, the pre-processing unit 212 can perform the pre-processing of black level correction at once. Because of this, the signal processing device 22 need not necessarily execute pre-processing of the black level correction. In this manner, the signal processing devices 21 and 22 can change whether to share the pre-processing of the black level correction according to the number of pixels of the horizontal direction of the image sensor mounted on the imaging device.

For example, the image sensor 100 is driven in the pixel addition mode and pixel signals are added in the horizontal direction. Thereby, when an image of 5000 pixels with a width of ½ is output, a data amount of image data output by the image sensor 100 as one row is less than a data amount (6000 pixels) of image data of one row capable of being held by the line memory provided in the pre-processing unit 212 within the imaging processing unit 210 provided in the signal processing device 21. Even in this case, the signal processing device 22 need not necessarily execute pre-processing of black level correction because the pre-processing unit 212 can perform the pre-processing of the black level correction at once. In this manner, based on a driving mode of the image sensor mounted on the imaging device, the signal processing devices 21 and 22 can change whether to share the pre-processing of the black level correction. For example, when driving is performed in the full pixel output mode, that is, at the time of a mode in which a still image is captured, the signal processing devices 21 and 22 share the pre-processing of the black level correction. For example, when driving is performed in the pixel addition mode, that is, at the time of the mode in which a moving image or a live view is captured, only the signal processing device 21 performs the pre-processing of the black level correction.

In the second embodiment, as in the first embodiment, the case in which the image sensor 100 outputs a pixel signal subjected to raster scanning in the horizontal direction on an image as image data and divides the image in the horizontal direction has been described. However, by considering the horizontal direction and the vertical direction of the image inversely in the second embodiment as in the first embodiment, it is possible to apply the concept of the present invention, for example, even when the image sensor outputs a pixel signal subjected to raster scanning in the vertical direction (longitudinal direction) on an image as image data or the image is divided in the vertical direction.

For example, a configuration in which the data extracting unit 211 provided in the imaging processing unit 210 performs a process of extracting OB data from image data input from the image sensor 100 and dividing the image region and the pre-processing unit 212 performs black level correction on subject data of a divided image region based on OB data input from the data extracting unit 211 in the signal processing device 21 has been described in the second embodiment. However, the configuration in which the process of extracting OB data from image data input from the image sensor 100 and dividing the image region is performed is not limited to the configuration of the imaging device 11 according to the second embodiment. For example, the pre-processing unit 212 may be configured to perform the pre-processing including the black level correction after extracting the OB data for performing the black level correction and dividing the image region. In this case, for example, the imaging processing unit 210 within the signal processing device 21 can be configured without the data extracting unit 211.

The configuration of the imaging processing unit within the signal processing device provided in the imaging device is not limited to a configuration similar to those of the imaging processing unit 210 provided in the signal processing device 21 and the imaging processing unit 220 provided in the signal processing device 22 shown in the imaging device 11 according to the second embodiment. For example, the configuration of the imaging processing unit within the signal processing device provided in the imaging device can be configured to be similar to that of the imaging processing unit 200 provided in the imaging device 10 according to the first embodiment. In the case of this configuration, each signal processing device provided in the imaging device can execute the pre-processing of the black level correction through a plurality of operations as in the imaging device 10 according to the first embodiment.

The case in which the two signal processing devices (signals processing devices 21 and 22) are provided in the imaging device 11, the image region of one image P1 input from the image sensor 100 is divided into two, and the two signal processing devices perform pre-processing of black level correction on subject data of image region divisions has been described in the second embodiment. That is, a configuration in which a plurality of signal processing devices each having one imaging processing unit are provided and simultaneously execute black level correction on subject data of a plurality of image region divisions has been described. However, the configuration of the imaging processing unit provided within one signal processing device is not limited to a configuration shown in the imaging device 11 according to the second embodiment. For example, likewise, it is possible to apply the concept of the present invention even when a plurality of imaging processing units are configured to be included within one signal processing device.

Third Embodiment

Next, the case in which the concept of the present invention is applied to the imaging device according to the third embodiment including a plurality of imaging processing units within one signal processing device will be described. In the following description, an imaging device of a configuration in which two imaging processing units simultaneously execute pre-processing including black level correction for image data as in the imaging device 11 according to the second embodiment will be described. In the description of the imaging device according to the third embodiment, the same reference signs are assigned to components similar to those of the imaging device 10 according to the first embodiment and the imaging device 11 according to the second embodiment, and a detailed description of the components and operations similar to those of the imaging device 10 according to the first embodiment and the imaging device 11 according to the second embodiment will be omitted.

Figure 13:
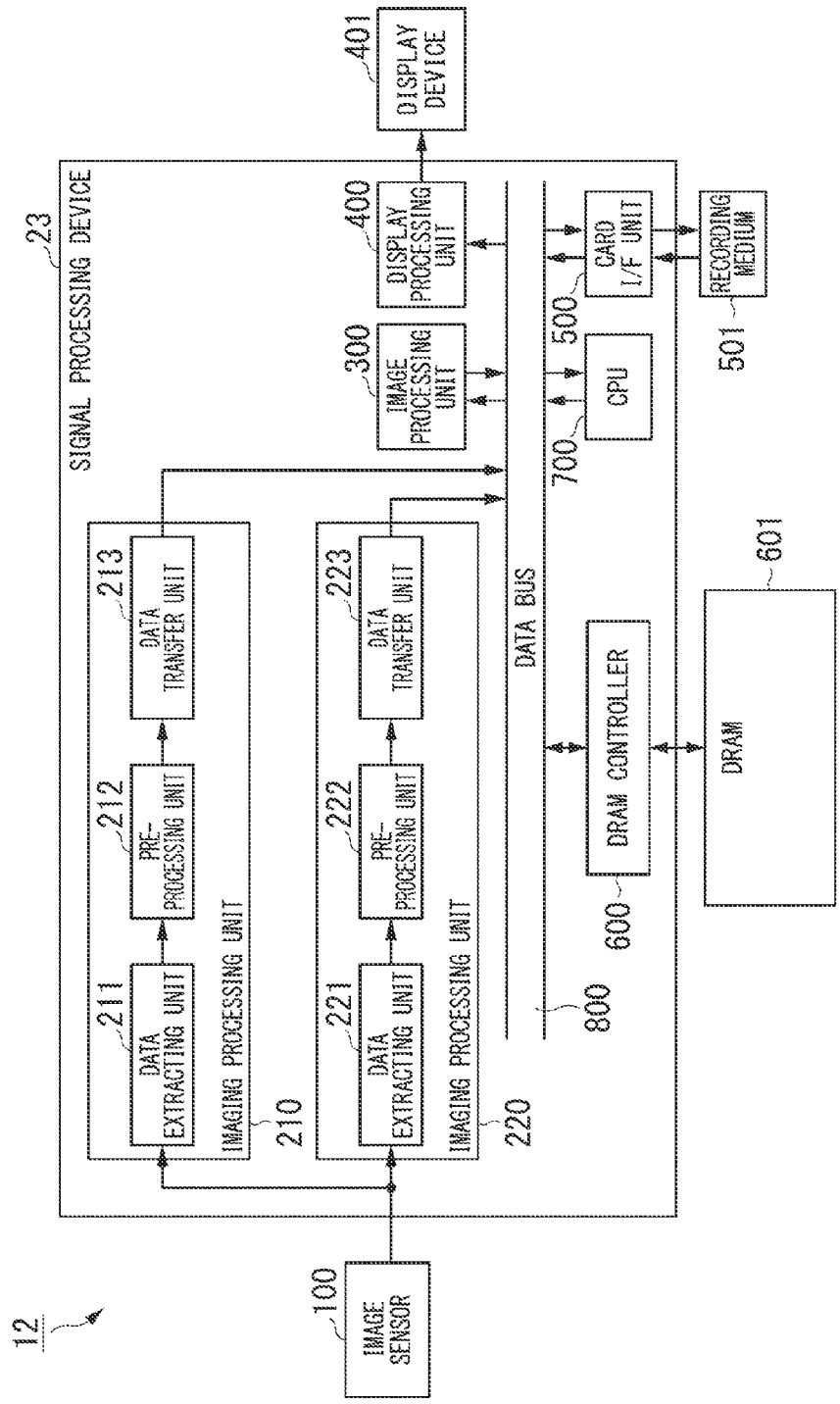
FIG. 13 is a block diagram showing a schematic configuration of an imaging device according to a third embodiment of the present invention.
Figure 14A:
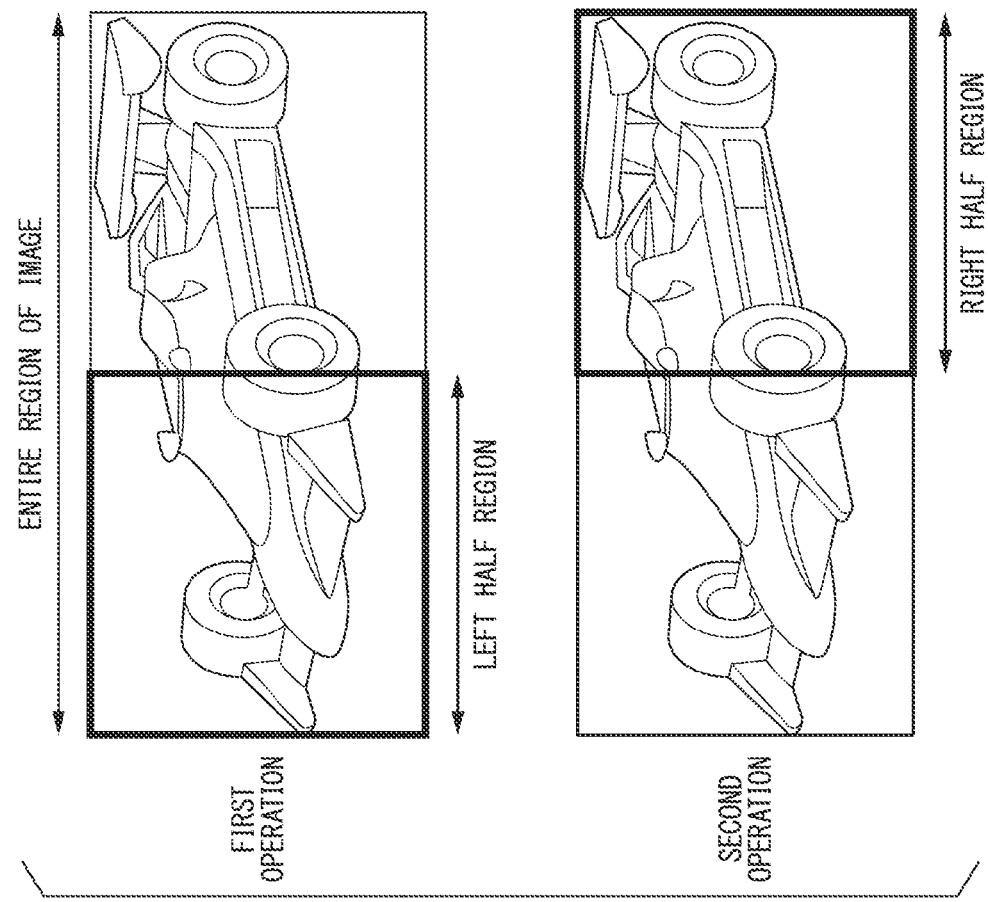
FIG. 14A is a diagram showing an example of an image on which image processing and black level correction are executed in the conventional imaging device.
Figure 14B:
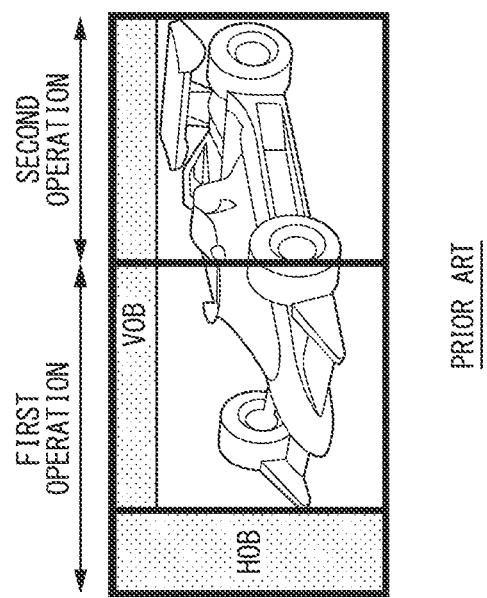
FIG. 14B is a diagram showing an example of an image on which image processing and black level correction are executed in the conventional imaging device.

FIG. 13 is a block diagram showing a schematic configuration of the imaging device in the third embodiment.

The imaging device 12 shown in FIG. 13 includes an image sensor 100, a signal processing device 23, a display device 401, a recording medium 501, and a DRAM 601.

The image sensor 100, the display device 401, the recording medium 501, and the DRAM 601 provided in the imaging device 12 are similar to the image sensor 100, the display device 401, the recording medium 501, and the DRAM 601 provided in the imaging device 10 according to the first embodiment, respectively.

The signal processing device 23 simultaneously performs processing on image data shared by the signal processing devices 21 and 22 provided in the imaging device 11 according to the second embodiment. The signal processing device 23 includes an imaging processing unit 210, an imaging processing unit 220, an image processing unit 300, a display processing unit 400, a card I/F unit 500, a DRAM controller 600, and a CPU 700. Each of the imaging processing unit 210, the imaging processing unit 220, the image processing unit 300, the display processing unit 400, the card I/F unit 500, the DRAM controller 600, and the CPU 700 is connected via the data bus 800, and, for example, reads data from the DRAM 601 connected to the DRAM controller 600 through DMA and writes data to the DRAM 601.

The imaging processing unit 300, the display processing unit 400, the card I/F unit 500, the DRAM controller 600, the CPU 700, and the data bus 800 provided in the signal processing device 23 are similar to the imaging processing unit 300, the display processing unit 400, the card I/F unit 500, the DRAM controller 600, the CPU 700, and the data bus 800 provided in the imaging device 10 according to the first embodiment, respectively.

Like the imaging processing unit 210 within the signal processing device 21 provided in the imaging device 11 according to the second embodiment, the imaging processing unit 210 fetches image data input from the image sensor 100 to divide the fetched image data into OB data and subject data. Further, the imaging processing unit 210 transfers (writes) the resulting pre-processed image data obtained by performing pre-processing including the black level correction based on the OB data for the subject data to the DRAM 611 via the DRAM controller 600. The imaging processing unit 210 includes a data extracting unit 211, a pre-processing unit 212, and a data transfer unit 213.

Like the imaging processing unit 220 within the signal processing device 22 provided in the imaging device 11 according to the second embodiment, the imaging processing unit 220 fetches image data input from the image sensor 100 to divide the fetched image data into OB data and subject data. The imaging processing unit 220 transfers (writes) the resulting pre-processed image data obtained by performing pre-processing including the black level correction based on the OB data for the subject data to the DRAM 611 via the DRAM controller 600. The imaging processing unit 220 includes a data extracting unit 221, a pre-processing unit 222, and a data transfer unit 223.

The imaging processing units 210 and 220 are similar to the imaging processing units 210 and 220 provided in the signal processing devices 21 and 22 within the imaging device 11 according to the second embodiment, respectively. In addition, the data extracting unit 211, the pre-processing unit 212, and the data transfer unit 213 provided in the imaging processing unit 210 are similar to the data extracting unit 211, the pre-processing unit 212, and the data transfer unit 213 within the imaging processing unit 210 provided in the signal processing device 21 within the imaging device 11 according to the second embodiment, respectively. In addition, the data extracting unit 221, the pre-processing unit 222, and the data transfer unit 223 provided in the imaging processing unit 220 are similar to the data extracting unit 221, the pre-processing unit 222, and the data transfer unit 223 within the imaging processing unit 220 provided in the signal processing device 22 within the imaging device 11 according to the second embodiment, respectively.

Through this configuration, like the imaging device 11 according to the second embodiment, the imaging device 12 according to the third embodiment divides subject data included in fetched image data into two while fetching the image data output from the image sensor 100 in real time, and each of the imaging processing units 210 and 220 simultaneously performs various pre-processing including the black level correction based on OB data directly for subject data divisions by sharing the pre-processing.

Because an operation in which the imaging device 12 performs pre-processing (black level correction based on OB data) on subject data included in image data output from the image sensor 100 is similar to the operation in the imaging device 11 according to the second embodiment, a detailed description thereof is omitted here.

However, as shown in FIG. 13, two imaging processing units (the imaging processing units 210 and 220) are provided within one signal processing device 23 in the imaging device 12 according to the third embodiment. Therefore, the resulting pre-processed image data obtained after each of the imaging processing units 210 and 220 performs the black level correction is transferred (written) to one DRAM 601. Also, in the operation of the black level correction in the imaging device 12 according to the third embodiment, it is possible to store the pre-processed image data (the pre-processed image data of the image P3+the image P5 in the operation of the imaging device 11 according to the second embodiment) obtained by performing the black level correction on the subject data of the entire region of one image captured by the image sensor 100 without performing an operation of transferring the pre-processed image data executed in the path of the image data of the paths C23 and C28 within the operation of the imaging device 11 according to the second embodiment shown in FIGS. 11 and 12.

As described above, even in the configuration of the imaging device according to the third embodiment, subject data included in the image data output from the image sensor 100 is divided in the black level correction and each of the imaging processing units 210 and 220 simultaneously performs the black level correction based on the OB data of the same OB region on each corresponding subject data division. Thereby, even in the imaging device 12 according to the third embodiment, it is possible to obtain an advantageous effect similar to those of the imaging devices 10 according to the first embodiment and the imaging device 11 according to the second embodiment.

As described above, in a mode for carrying out the present invention, only an image region within the pixel unit of the image sensor is divided and the black level correction on subject data of image region divisions is performed based on the HOB data of the same HOB region, that is, common HOB data. Thereby, in the mode for carrying out the present invention, it is possible to perform good black level correction on one entire image without disharmony in a boundary part along which the black level correction is divided even when the black level correction is performed by dividing an image output from the image sensor into a plurality of divisions.

In the mode for carrying out the present invention, the black level correction on the subject data of image region divisions is performed through a plurality of separate operations or a plurality of imaging processing units simultaneously execute the black level correction, and therefore the black level correction is performed on all the image data of one image input from the image sensor. Thereby, in the mode for carrying out the present invention, it is possible to perform the black level correction on all the input subject data even when a data amount of subject data output by the image sensor is greater than a data amount of subject data capable of being held by the line memory provided in the pre-processing unit within the imaging processing unit. Accordingly, in the mode for carrying out the present invention, it possible to easily implement a configuration in which black level correction corresponding to an image sensor having an increased number of pixels is performed.

The case in which an HOB region is located on a left end of the image region and a VOB region is located on an upper end of the image region in the pixel unit of the image sensor 100 has been described in the mode for carrying out the present invention. However, the positions of the HOB and VOB regions are not limited to the positions described in the mode for carrying out the present invention. For example, the case in which the HOB region is located on a right end of the image region or the case in which the VOB region is located on a lower end of the image region can also be similarly considered. In addition, for example, the case in which HOB regions are located on both the left and right ends of the image region or the case in which VOB regions are located on both the lower and upper ends of the image region can also be similarly considered by extracting OB data of one or two OB regions.

As described above, the case in which the pre-processing is a process including black level correction based on OB data has been described in the mode for carrying out the present invention. However, processing content of the pre-processing is not limited to those which are disclosed in the embodiments of the present invention. The concept of the present invention is similarly applicable even when a process other than the black level correction is performed in any process using data common in subject data of a divided image region.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising:
   a solid-state imaging device configured to include a plurality of pixels, the solid-state imaging device outputting subject data according to a pixel signal output by the pixel of an image region on which subject light is incident and optical black (OB) data according to the pixel signal output by the pixel of a constantly shielded OB region of a plurality of columns or rows located on at least an end of the image region as image data; and
   an imaging processing unit configured to output pre-processed image data obtained by performing black level correction on partial subject data included in the image data using the same OB data included in the image data output by the solid-state imaging device;

a data extracting unit configured to extract the OB data common in the subject data included in the image data output by the solid-state imaging device as extraction OB data and output each of the subject data and the extraction OB data included in the image data;

a pre-processing unit configured to include a line memory configured to hold an amount of subject data which is less than a data amount of the subject data of a first direction in the image region and output the pre-processed image data obtained by performing the black level correction based on the extraction OB data for the subject data output from the data extracting unit and held in the line memory; and a storage unit configured to store at least the pre-processed image data, wherein the data extracting unit divides the image region within the range of the data amount of the subject data capable of being held by the line memory, outputs the subject data and the extraction OB data of a first image region on which the pre-processing unit is able to perform the black level correction to the pre-processing unit, and outputs the subject data and the extraction OB data of a second image region on which the pre-processing unit has not performed the black level correction and which is different from the first image region as original image data, wherein the pre-processing unit outputs the pre-processed image data obtained by performing the black level correction based on the extraction OB data for the subject data of the first image region, and wherein the imaging processing unit further includes:
a first data transfer unit configured to transfer the pre-processed image data to the storage unit; and
a second data transfer unit configured to transfer the original image data to the storage unit.

2. The imaging device according to claim 1 wherein OB regions are located on one or both ends in a second direction orthogonal to the first direction in the image region, and the data extracting unit divides the image region so that image region divisions are arranged in the first direction and extracts the OB data within the OB region located on at least one end in the second direction corresponding to the overlap region in which the image region divisions overlap as the extraction OB data to be commonly used when the pre-processing unit performs the black level correction on the subject data.

3. The imaging device according to claim 1, wherein OB regions are located on one or both ends in the first direction in the image region, and the data extracting unit divides the image region so that image region divisions are arranged in the first direction and extracts the OB data within the OB region located on at least one end in the first direction as the extraction OB data to be commonly used when the pre-processing unit performs black level correction on the subject data.

4. The imaging device according to claim 1, wherein the imaging processing unit further includes:

a data acquiring unit configured to acquire original image data stored in the storage unit, and the data extracting unit outputs the subject data and the extraction OB data of the first image region or the subject data and the extraction OB data included in the original image data acquired by the data acquiring unit to the pre-processing unit.

5. The imaging device according to claim 4, wherein in the first operation, the imaging processing unit transfers first pre-processed image data after the pre-processing unit performs the black level correction based on the extraction OB data for the subject data of the first image region to the storage unit through the first data transfer unit and transfers the original image data to the storage unit through the second data transfer unit, and in a second operation after the first operation is completed, the data acquiring unit acquires the original image data stored in the storage unit, the data extracting unit outputs the subject data and the extraction OB data of the second image region included in the original image data to the pre-processing unit, and the pre-processing unit transfers second pre-processed image data obtained by performing the black level correction based on the extraction OB data for the subject data of the second image region to the storage unit through the first data transfer unit.

6. The imaging device according to claim 1, comprising:
a plurality of imaging processing units; and
a storage unit configured to store the pre-processed image data output from the plurality of imaging processing units, wherein each imaging processing unit further includes:
a data transfer unit configured to transfer the pre-processed image data to the storage unit, wherein the data extracting unit provided in each imaging processing unit divides the image region into regions different from those of the image region divided by the data extracting unit provided in another imaging processing unit in a range of a data amount of the subject data capable of being held by the line memory provided in a corresponding pre-processing unit, and outputs the subject data and the extraction OB data of the divided image region to the pre-processing unit, the pre-processing unit provided in each imaging processing unit outputs the pre-processed image data obtained by performing the black level correction based on the extraction OB data for the subject data of the image region divided by a corresponding data extracting unit, and the data transfer unit provided in each imaging processing unit transfers the pre-processed image data output from the corresponding pre-processing unit to the storage unit.

7. The imaging device according to claim 6, wherein each imaging processing unit simultaneously executes the black level correction based on the extraction OB data for the subject data of a corresponding image region through the pre-processing unit and transfers pre-processed image data to the storage unit through the data transfer unit.

8. The imaging device according to claim 7, wherein
a plurality of storage units are provided to store the pre-processed image data output from a corresponding imaging processing unit, and
each imaging processing unit further includes a communication unit configured to transmit and receive the pre-processed image data stored in each storage unit.

9. The imaging device according to claim 8, wherein after each imaging processing unit transfers the pre-processed image data to the corresponding storage unit, any one communication unit transfers the pre-processed image data stored in each storage unit to any one corresponding storage unit.

* * * * *